(12) United States Patent
Kurokawa et al.

(10) Patent No.: US 6,645,402 B1
(45) Date of Patent: Nov. 11, 2003

(54) ELECTRON EMITTING DEVICE, ELECTRON EMITTING SOURCE, IMAGE DISPLAY, AND METHOD FOR PRODUCING THEM

(75) Inventors: Hideo Kurokawa, Katano (JP); Tetsuya Shiratori, Osaka (JP); Masahiro Deguchi, Hirakata (JP); Makoto Kitabatake, Nara (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/582,801
(22) PCT Filed: Jun. 17, 1999
(86) PCT No.: PCT/JP99/03240
  § 371 (c)(1),
  (2), (4) Date: Jun. 30, 2000
(87) PCT Pub. No.: WO99/66523
  PCT Pub. Date: Dec. 23, 1999

(30) Foreign Application Priority Data

Jun. 18, 1998 (JP) .............................. 10-171909
Jul. 17, 1998 (JP) .............................. 10-202995

(51) Int. Cl.[7] .............................. H01J 1/30; H01J 9/02; H01J 1/304
(52) U.S. Cl. .................. 252/502; 252/500; 252/501; 313/346; 427/533; 445/50; 445/51
(58) Field of Search .................. 252/500, 501, 252/502; 313/309, 310, 311, 344 R, 490, 495, 497; 445/24, 50, 51; 438/142

(56) References Cited

U.S. PATENT DOCUMENTS 5,608,283 A * 3/1997 Twichell et al. ............ 313/309
2001/0006869 A1 * 7/2001 Okamoto et al. ............ 445/51

FOREIGN PATENT DOCUMENTS

| EP | 0 675 519 | | 3/1995 | ............ H01J/31/12 |
|---|---|---|---|---|
| EP | 0913508 | * | 5/1999 | ............ D01F/9/127 |
| JP | 4087233 | | 3/1992 | |
| JP | 7-282715 | | 10/1995 | |
| JP | 8263010 | | 6/1996 | |
| JP | 09031757 | | 2/1997 | |
| JP | 09270227 | | 10/1997 | |
| JP | 09-270227 | * | 10/1997 | ............ H01J/1/30 |
| JP | 10040805 | | 2/1998 | |
| JP | 10149760 | | 6/1998 | |
| JP | 10-149760 | * | 6/1998 | ............ H01J/1/30 |
| JP | 11096893 | | 4/1999 | |
| JP | 2000-057934 A | * | 8/2000 | ............ H01J/1/30 |
| JP | 2000-231871 A | * | 8/2000 | ............ H01J/1/304 |
| RU | 098346 A2 | * | 5/2001 | ............ H01J/1/30 |

* cited by examiner

Primary Examiner—Yogendra N. Gupta
Assistant Examiner—Kallambella Vijayakumar
(74) Attorney, Agent, or Firm—Renner, Otto, Boisselle & Sklar

(57) ABSTRACT

An electron emitting device includes at least a first electrode and an electron emitting section provided on the first electrode. The electron emitting section is formed of a particle or an aggregate of particles. The particle contains a carbon material having a carbon six-membered ring structure. The carbon material having a carbon six-membered ring structure contains, for example, graphite or a carbon nanotube as a main component.

41 Claims, 22 Drawing Sheets

(a)　　　　　　　　　　(b)

ELECTRON EMITTING DEVICE, ELECTRON EMITTING SOURCE, IMAGE DISPLAY, AND METHOD FOR PRODUCING THEM

TECHNICAL FIELD

The present invention relates to an electron emitting device for emitting electrons and a method for producing the same, and in particular to an electron emitting device produced using particles containing a carbon material having a carbon six-membered ring structure or an aggregate thereof, and a method for producing the same. The present invention also relates to an electron emitting source including a plurality of such electron emitting devices, an image display apparatus utilizing such an electron emitting source, and a method for producing them.

BACKGROUND ART

Recently, micron-size electron emitting devices have actively been developed as electron sources replacing an electron gun for high definition, thin display apparatuses or as electron sources (emitter sections) of microscopic vacuum devices capable of high speed operation.

Conventionally, electron emitting devices of a "heat emission type", by which a high voltage is applied to a material of tungsten or the like heated to a high temperature to emit electrons are used. Recently, electron emitting devices of a "cold cathode type" which do not need to be heated to a high temperature and can emit electrons even at a low voltage have actively been developed. Various kinds of electron emitting devices of the cold cathode type are available. In general, a field emission (FE) type, a tunnel injection (MIM or MIS) type, and a surface conduction (SCE) type have been reported.

In an FE type electron emitting device, a voltage is applied to a gate electrode to apply an electric field to an electron emitting section. Thus, electrons are emitted from a cone-shaped projection formed of silicon (Si) or molybdenum (Mo). An MIM or MIS type electron emitting device includes a stacking structure including a metal layer, an insulating layer, a semiconductor layer and the like. Electrons are injected from the side of the metal layer and caused to pass through the insulating layer, utilizing the tunneling effect, and the electrons are emitted outside from an electron emitting section. In an SCE type electron emitting device, an electric current is caused to flow in a planar direction of a thin film formed on a substrate, and the electric current is emitted from an electron emitting section-formed in advance (in general, a microscopic crack portion existing in an electricity-conducting area in the thin film).

The structures of these cold cathode type electron emitting devices all have a feature that a precision machining technology is used to. reduce the size of the structure and raise the integration degree.

A cold cathode type electron emitting device is required to provide a high level of electric current when driven at a low voltage and a low power consumption and is also required to have a structure: which can be produced at low cost.

As such a cold cathode type electron emitting device, Japanese Laid-Open Publication No. 7-282715, for example, discloses a structure schematically shown in FIG. 1. The conventional structure shown in FIG. 1 utilizes diamond, which obtains a negative electron affinity when subjected to a specific treatment, as an electron emitting source. The structure shown in FIG. 1 uses diamond particles, instead of a diamond film, in an attempt to simplify the production process and also to reduce the production cost.

More specifically, with reference to FIG. 1, a conductive film 112 to be formed into an electrode is formed on a substrate 111, and an electron emitting section 114 formed of diamond particles 113 is formed on the conductive film 112. The diamond particles 113 have a negative electron affinity as a result of a specific treatment. An electron extraction electrode (not shown) is provided opposite to the diamond particles 113 By supplying the electron extraction electrode with an electric potential, the electrons are emitted outside from the electron emitting section 114 formed of the diamond particles 113.

The electron affinity at the surface of the diamond particles 113 is negative. Accordingly, the electrons injected from the conductive layer 112 to the diamond particles 113 are expected to be easily emitted from the diamond particles 113. With the structure shown in FIG. 1, theoretically, it is expected that the electrons can be emitted outside without a high voltage being applied to the electron extraction electrode (not shown) opposed to the diamond particles 113.

The structure shown in FIG. 1, which uses the diamond particles 113 to form the electron emitting section 114, can be formed easily and at low cost.

Generally, an electron emitting section included in an electron emitting device is required to fulfill the features of, for example, (1) easily emitting electrons at a relatively small electric field (i.e., capable of efficient electron emission), (2) providing a satisfactorily stable electric current, and (3) having a small over time change in the electron emitting characteristics. However, the electron emitting devices as described above which have been reported so far have problems of a large dependency of the operating characteristics on the shape of the electron emitting section or a large over time change.

With the conventional technology, it is difficult to produce electron emitting devices at a satisfactory reproducibility, and it is very difficult to control the operating characteristics thereof.

In the conventional structure shown in FIG. 1, the following problems may actually occur when emitting electrons from the electron emitting section 114.

First, unlike the above theory, the electron extraction electrode (not shown) opposed to the diamond particles 113 forming the electron emitting section 114 needs to be supplied with a high voltage as in the conventional device, despite the fact that the electron affinity of the diamond particle 113 is negative. This is because of an electron barrier existing at an interface between the conductive layer 112 and the diamond particles 113. Such a problem does not occur when the conductive layer 112 and the diamond particles 113 form an ohmic contact, but it is generally difficult, in terms of materials, to obtain an ohmic contact between the conductive layer 112 and the diamond particles 113. As a result, a Schottky contact is formed between the conductive layer 112 and the diamond particles 113. In order for electrons to be injected from the conductive layer 112 into the diamond particles 113, the electrons need to go over the electron barrier existing at the interface between the two. Therefore, the electron extraction electrode opposed to the diamond particles 113 needs to be supplied with a high voltage as in the conventional device in order to emit the electrons outside from the diamond particles 113 forming the electron emitting section 114.

In the structure shown in FIG. 1, the diamond particles 113 need to adhere to the conductive layer 112 uniformly and stably in order to allow each diamond particle 113 to act as an electron emitting source and to realize uniform and stable electron emission. However, the uniform and stable application is difficult. Especially, the application stability is significantly influenced by the size of the diamond particle 113. When, for example, the particle size is on the order of microns, some of the diamond particles 113 may drop, which makes stable electron emission difficult.

As described above, with the conventional structure shown in FIG. 1, it is difficult to obtain an electron emitting device having fully satisfactory operating characteristics. The exemplary reasons are that it is difficult to efficiently inject electrons from the conductive layer 112 into the diamond particles 113, and that it is difficult to cause the diamond particles 113 to uniformly and stably adhere to the conductive layer 112 and thus to fix the diamond particles 113 to uniformly and stably to the conductive layer 112. For these reasons, the structure of the conventional electron emitting device and the structure and materials of the electron emitting section included in the conventional electron emitting device do not fully satisfy the required characteristics.

DISCLOSURE OF THE INVENTION

The present invention made for solving the above-described problems has objectives of (1) providing an electron emitting device capable of obtaining a large amount of current at low voltage driving and a method for producing the same; (2) providing a highly stable electron emitting device which can be produced at low cost and is capable of efficiently emitting electrons, by using particles containing a carbon material having a carbon six-membered ring structure or an aggregate of the particles for an electron emitting section; (3) providing an electron emitting device capable of more efficiently emitting electrons, especially by using, particles containing a carbon material having a carbon six-membered ring structure as the electron emitting material; (4) providing a highly efficient electron emitting source by providing a plurality of electron emitting device described above; (5) providing an image forming apparatus for displaying a bright and stable image, using the above-described electron emitting source and the image forming member; (6) providing a method for producing an electron emitting device for easily and efficiently carrying out an important production process which uses particles containing a carbon material having a carbon six-membered ring structure used as the electron emitting section; and (7) providing a method for easily producing an, electron emitting device having a stably operating electron emitting section over a large area with a satisfactory reproducibility, by carrying our the step of uniformly fixing particles containing a carbon material having a carbon six-membered ring structure onto an electrode.

In accordance with one aspect of the present invention, an electron emitting device including at least a first electrode and an electron emitting section provided on the first electrode is provided. The electron emitting section is formed of a particle or an aggregate of particles, and the particle contains a carbon material having a carbon six-membered ring structure. By this, the above-described objectives are achieved.

In one embodiment, the electron emitting device further includes a second electrode provided in the vicinity of the electron emitting section.

In one embodiment, the electron emitting section is fixed to the first electrode with a fixing material.

In one embodiment, the first electrode has a surface having a rugged pattern, and the electron emitting section is provided on the rugged pattern of the surface.

In one embodiment, the carbon material having a carbon six-membered ring structure has graphite as a main component.

In one embodiment, the graphite is highly oriented graphite.

Preferably, the electron emitting section is provided on the first electrode in a state where a portion at which a σ bond of carbon six-membered rings is broken is directed in an electron emitting direction.

In one embodiment, the carbon material having a carbon six-membered ring structure has graphite as a main component, and the electron emitting section is provided on the first electrode in a state where the normal to a direction in which layers of graphite are laid is substantially parallel to a surface of the first electrode.

Alternatively, the carbon material having a carbon six-membered ring structure has graphite as a main component. The electron emitting section is provided on the first electrode in a state where the normal to a direction in which layers of graphite are laid is substantially perpendicular to a surface of the first electrode. A portion at which a σ bond of carbon six-membered rings is broken exists on a top surface of the graphite.

In one embodiment, the carbon material having a carbon six-membered ring structure has a carbon nanotube as a main component.

For example, a tip of the carbon nanotube projects from a surface of the particle.

Preferably, a tip of the carbon nanotube is opened without being closed.

For example, the carbon nanotube is formed by refining bulk carbon containing a carbon nanotube generated by arc discharge between carbon electrodes.

Alternatively, the carbon nanotube is formed by a plasma CVD technique utilizing a catalyst.

Preferably, the fixing material is a vehicle.

In one embodiment, the first electrode includes an element which is capable of generating a carbon compound.

In one embodiment, the first electrode includes a multiple layer structure including at least one semiconductor layer.

In accordance with another aspect of the present invention, in an electron emitting device including at least a first electrode and an electron emitting section provided on the first electrode, the electron emitting section is formed of a particle or an aggregate of particles, and the electron emitting section is fixed on the first electrode with a fixing material. By this, the above-described objectives are achieved.

Preferably, the particle contains a carbon material having a carbon six-membered ring structure.

Preferably, the fixing material is a vehicle.

Preferably, the fixing material exists only in a portion of a surface of the first electrode at which the electron emitting section is fixed and does not exist in the remaining part of the surface of the first electrode.

In accordance with still another aspect of the present invention, in a method for producing an electron emitting device including at least the steps of forming a first electrode, and providing an electron emitting section formed of a particle or an aggregate of particles on the first electrode; a particle formed of a material containing a carbon material having a carbon six-membered ring structure is used as the particle. By this, the above-described objectives are achieved.

In one embodiment, the method further includes the step of providing a second electrode in the vicinity of the electron emitting section.

In one embodiment, the step of providing the electron emitting section includes the step of fixing the electron emitting section to the first electrode with a fixing material.

Preferably, a vehicle is used as the fixing material.

In one embodiment, the method further includes the step of forming a surface of the first electrode to have a rugged pattern, and the electron emitting section is provided along the rugged pattern.

For example, the rugged pattern is formed by a sand blasting technique.

Alternatively, the rugged pattern is formed by an etching technique.

In one embodiment, the step of providing the electron emitting section on the first electrode includes:

an application step of applying a solution obtained by mixing the particle in a prescribed fixing material onto a surface of the first electrode, and a drying step of drying the applied solution.

The application step can be performed by spinner application.

Preferably, by the drying step, the fixing material is removed from a part of a surface of the electron emitting section, the part being in the vicinity of an electron emitting site and including the electron emitting site.

In one embodiment, the method further includes the step of removing the fixing material at least from a part of a surface of the electron emitting section, the part being in the vicinity of an electron emitting site and including the electron emitting site.

In one embodiment, the step of providing the electron emitting section on the first electrode includes an application step of applying a solution which contains a particle forming the electron emitting device mixed therein onto a surface of the first electrode, and a treatment step of removing the solution at least from a part of a surface of the electron emitting section, the part being in the vicinity of an electron emitting site and including the electron emitting site, while forming a carbide between the electron emitting section and the first electrode. The electron emitting section is fixed to the first electrode with the carbide.

Preferably, the treatment step includes a step of exposure to a plasma containing at least one of hydrogen, oxygen, nitrogen, argon, krypton and hydrocarbon.

In accordance with still another aspect of the present invention, in a method for producing an electron emitting device including at least the steps of forming a first electrode, and providing an electron emitting section formed of a particle or an aggregate of particles on the first electrode; the step of providing the electron emitting section on the first electrode includes an application step of applying a solution obtained by mixing a prescribed fixing material and the particle forming the electron emitting section onto a surface of the first electrode, and a drying step of drying the solution so as to remove the fixing material at least from a part of a surface of the electron emitting section, the part being in the vicinity of an electron emitting site and including the electron emitting site. By this, the above-described objectives are achieved.

Preferably, a particle formed of a material containing a carbon material having a carbon six-membered ring structure is used as the particle.

Preferably, a vehicle is used as the fixing material.

Preferably, as a result of the drying step, the fixing material exists only in a portion of the surface of the first electrode at which the electron emitting section is fixed and does not exist in the remaining part of the surface of the first electrode.

An electron emitting source according to the present invention includes a plurality of electron emitting devices arranged in a prescribed pattern; and means for supplying an input signal to each of the plurality of electron emitting devices. Each of the plurality of electron emitting devices is an electron emitting device described above according to the present invention. The plurality of electron emitting devices each emit electrons in accordance with the input signal thereto. By this, the above-described objective are achieved.

An image display apparatus according to the present invention includes an electron emitting source described above according to the present invention, and an image forming member irradiated with electrons emitted from the electron emitting source to form an image. By this, the above-described objectives are achieved.

A method for producing an electron emitting source according to the present invention includes the steps of forming a plurality of electron emitting devices which are arranged in a prescribed pattern so as to emit electrons in accordance with an input signal to each of the plurality of electron emitting devices; and forming means for supplying the input signal to each of the plurality of electron emitting devices. Each of the plurality of electron emitting devices is formed by a method described above according to the present invention. By this, the above-described objectives are achieved.

A method for producing an image display apparatus according to the present invention includes the steps of forming an electron emitting source; and providing an image forming member, irradiated with electrons emitted from the electron emitting source to form an image, at a prescribed positional relationship with respect to the electron emitting source. The electron emitting source is formed by a method described above according to the present invention. By this, the above-described objectives are achieved.

BEST MODE FOR CARRYING OUT THE INVENTION

Figure 1:
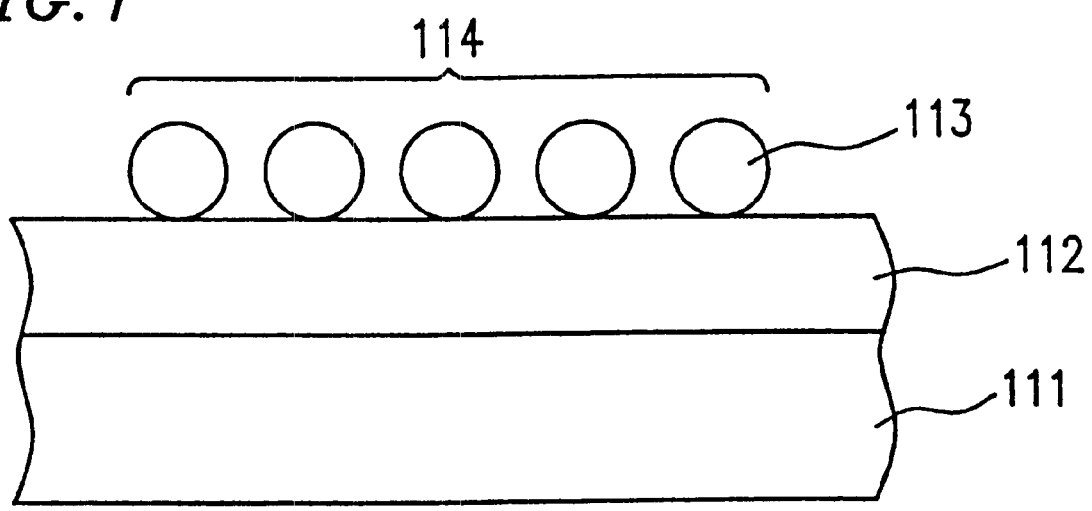
FIG. 1 is a view schematically showing a structure of a cold cathode type electron emitting device of a conventional technology.

Hereinafter, the present invention will be described by way of various examples with reference to the accompanying drawings. In the drawings, corresponding elements bear identical reference numerals, and overlapping descriptions may be omitted.

In order to realize a highly efficient electron emitting device, the design of the device structure and the selection of the materials for facilitating electron emission are important considerations. From the viewpoint of practical use, a device which can be produced at low cost is desired. According to the present invention, particles containing a carbon material having a carbon six-membered ring structure or an aggregate thereof are used for an electron emitting section to realize an electron emitting device which emits electrons at a high efficiency, is capable of surface emission, and is easily produced.

In this specification, the "particle" is not limited to any specific shape. The term "particle" generically refers to separated individual objects of various shapes such as a needle shape, cylindrical shape, a spherical shape and the like as well as separated individual objects having a so-called particle shape. In the following description, the "particles or an aggregate thereof" may be referred to as a "particle" for simplicity.

EXAMPLE 1

Figure 2:
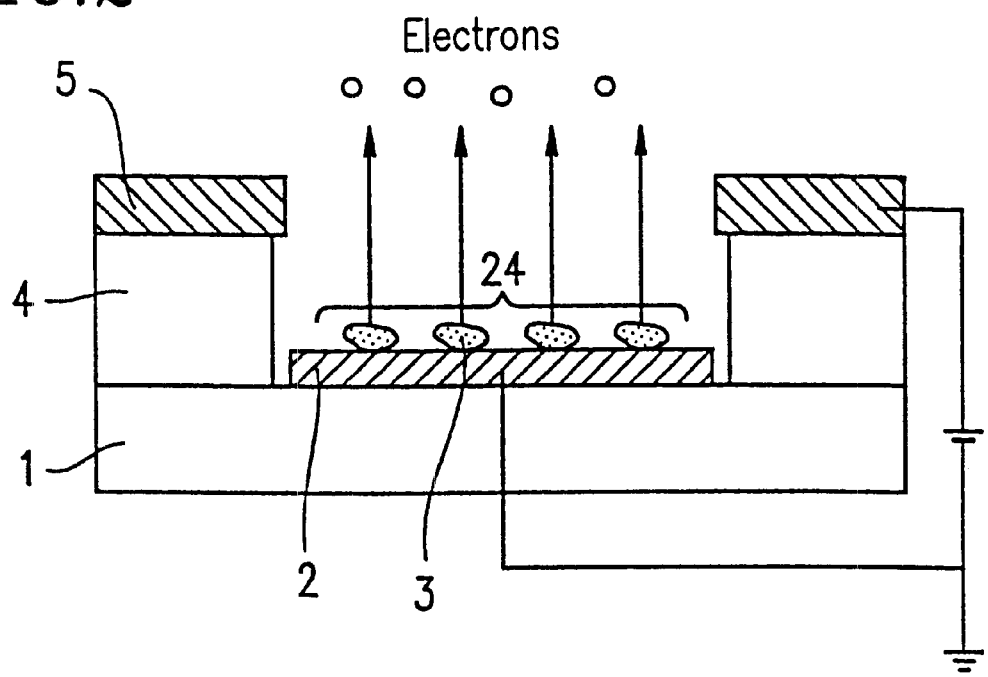
FIG. 2 is a view schematically showing an electron emitting device in a first example according to the present invention.

An electron emitting device according to the present invention includes at least a first electrode (conductive layer) and a cold cathode section containing particles fixed to the first electrode. FIG. 2 schematically shows a structure of an electron emitting device in a first example according to the present invention.

Specifically in FIG. 2, reference numeral 1 represents a substrate (glass substrate in this example), reference numeral 2 represents a first electrode (chromium electrode in this example), reference numeral 24 represents an electron emitting section, reference numeral 4 represents an insulating layer ($SiO_2$ layer in this example), and reference numeral 5 represents a second electrode (aluminum electrode in this example). The electron emitting section 24 is formed of particles 3, for example, graphite particles 3.

The electron emitting device in this example is formed by a process described below with reference to FIGS. 3 through 6.

Figure 3:
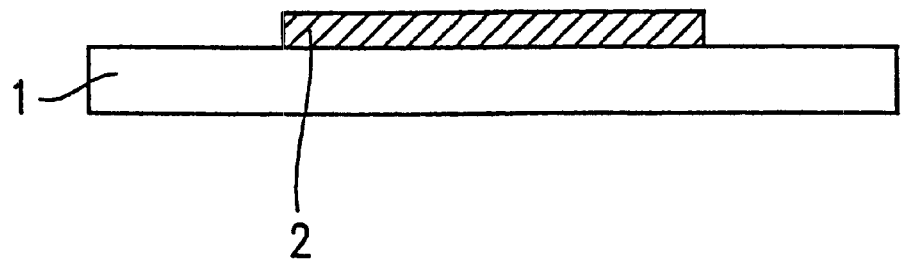
FIG. 3 is a view illustrating one step of a production process of the electron emitting device in the first example according to the present invention.

First as shown in FIG. 3, the chromium electrode 2 having a thickness of 200 nm is formed on the glass substrate 1 by an RF sputtering technique.

Figure 4:
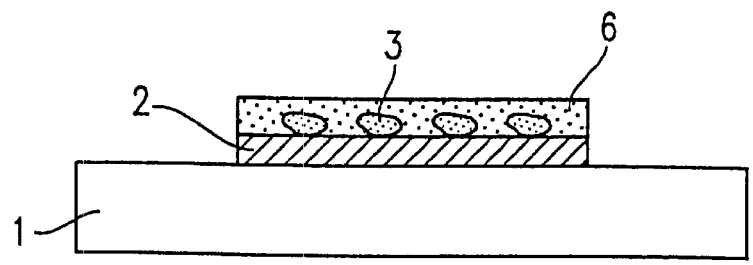
FIG. 4 is a view illustrating one step of a production process of the electron emitting device in the first example according to the present invention.

Next, 400 mg of graphite particles having an average particle size of 5 μm are mixed into 20 cc of a solution obtained by diluting isobutyl methacrylate with butyl carbitol, and is uniformly dispersed by, for example, supersonic stirring or stirring using a rotation roller. At this point, the distribution density of the graphite particles is $2\times10^7/cm^2$. The resultant solution is applied to the chromium electrode 2 by a spinner and left in a 300° C. atmosphere for 1 hour to be dried. Thus, as shown in FIG. 4, the graphite particles 3 adhere to the chromium electrode 2. In FIG. 4, reference numeral 6 represents an organic material contained in the solution in which the graphite particles 3 were dispersed.

Figure 5:
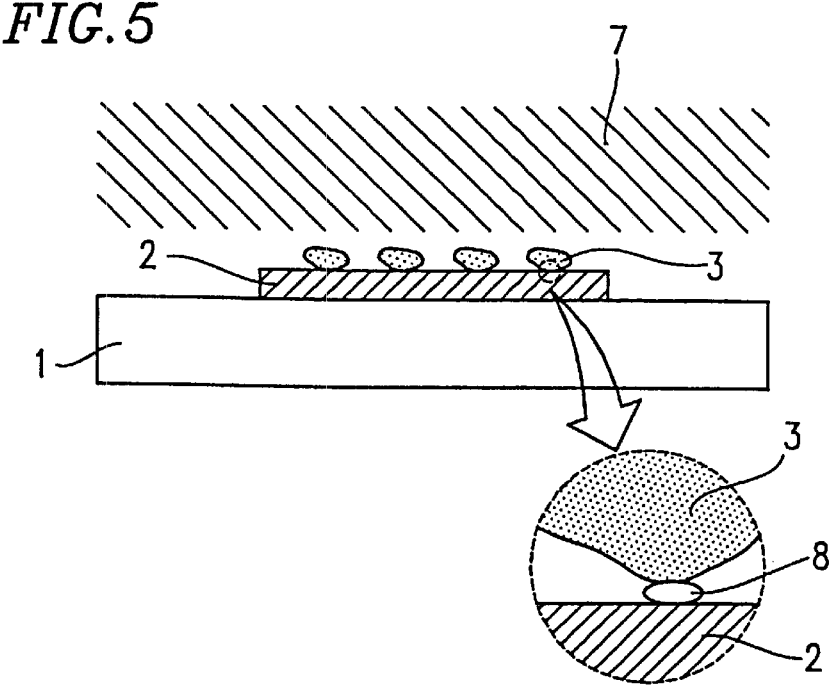
FIG. 5 is a view illustrating one step of a production process of the electron emitting device in the first example according to the present invention.
Figure 6:
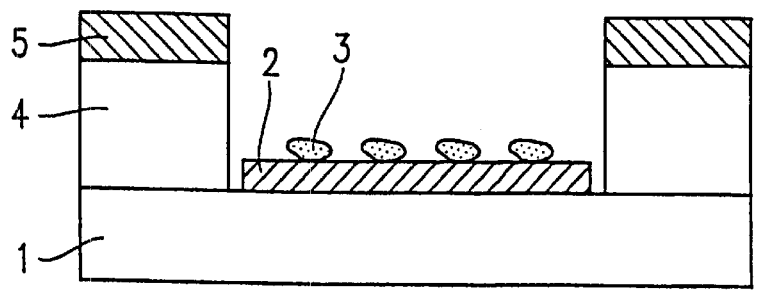
FIG. 6 is a view illustrating one step of a production process of the electron emitting device in the first example according to the present invention.

After drying, as shown in FIG. 5, a surface of the electrode having the graphite particles 3 applied thereto is exposed to a hydrogen plasma 7 to remove the organic material 6 remaining on a surface of the graphite particles 3. The temperature of the glass substrate 1 at this point is, for example, 350 degrees. By appropriately setting the temperature of the plasma 7 and the substrate 1, a part of the organic material 6 exposed to the plasma 7 is decomposed and thus removed, and another part of the organic material 6 positioned between the graphite particles 3 and the chromium electrode 2 is carbonized into a carbide 8 as shown in the circle magnification in FIG. 5 and remains after the treatment. This carbide 8 fixes the graphite particles 3 to the chromium electrode 2. By removing the part of the organic material 6 on the surface of the graphite particles 3, the electron emitting characteristics from the graphite particles 3 (electron emitting section 24) is stably maintained.

Then, the $SiO_4$ layer 4 (thickness: 15 μm) and the aluminum electrode 5 (thickness: 0.1 μm) are sequentially formed by a sputtering technique, and a hole is formed at a prescribed position by etching. The chromium electrode 2 having the graphite particles 3 adhering thereto is positioned in the hole (see FIG. 6).

With the electron emitting device produced by the above-described process, when a potential difference of 45 V was applied between the chromium electrode 2 and the aluminum electrode 5, electron emission from the graphite particles 3 started. Then, when a potential difference of 75 V was applied, an electron emission density of about 30 $\mu A/mm^2$ could be confirmed.

In this example, the part of the organic material 3 remaining on the surface of the graphite particles 3 is removed by hydrogen plasma treatment, and the carbide 8 is formed between the graphite particle 3 and the first electrode (chromium electrode) 2 by hydrogen plasma treatment and thus the graphite particles 3 is fixed to the first electrode 2. However, the method for removing unnecessary remaining organic material and the method for fixing the graphite particles are not limited to the above-mentioned methods. For example, the above-described process can include the step of exposure to a plasma containing at least one of hydrogen, oxygen, nitrogen, argon, krypton and hydrocarbon. The part of the organic material 6 directly exposed to such a plasma is decomposed and thus removed, whereas the part of the organic material 6 existing between the electron emitting section 24 (particles 3 of an electron emitting material containing a carbon material having a carbon six-membered ring structure) and the first electrode 2 is partially decomposed into the carbide 8 (carbon or a material having carbon as a main component). The carbide 8 acts as a fixing material to strongly fix the electron emitting section 24 (particles 3) to the first electrode 2.

In the above-described structure, the graphite particles 3 are used for the electron emitting section 24. The material of the electron emitting section 24 is not limited to the graphite particles 3, but can be any material containing a carbon material having a carbon six-membered ring structure. The present inventors confirmed, however, that it is practically desirable to form the electron emitting section. 24 of the graphite particles 3 or an aggregate of graphite particles.

Figure 7:
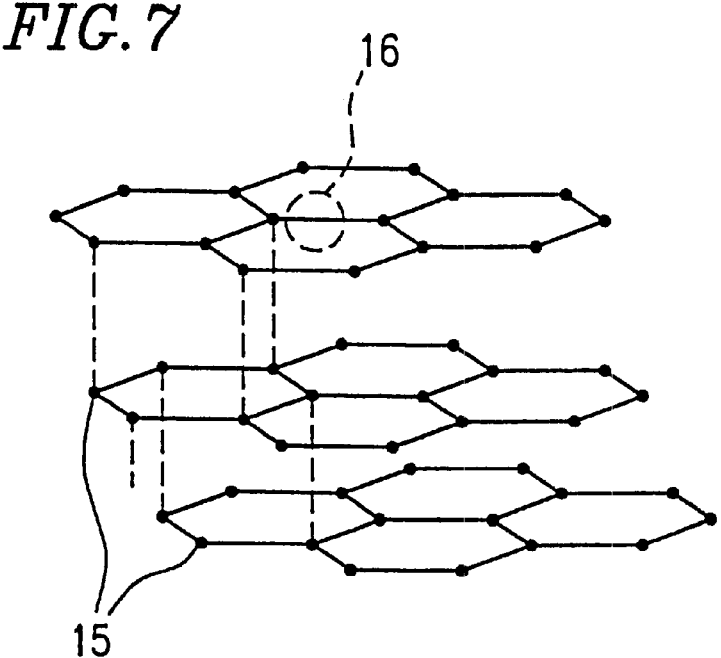
FIG. 7 is a view schematically showing a layer structure of graphite.

As shown in FIG. 7, graphite has a layer structure in which carbon six-membered rings are connected in a continuous chain. Studies conducted by the present inventors found that electrons are more likely to be emitted from portions 15 at which the carbon six-membered rings are not bonded to any other carbon six-membered ring (portions at which a σ bond of the carbon six-membered rings has been broken). The present inventors also found that it is difficult to emit electrons from a surface portion 16 of the carbon six-membered rings.

Figure 8:
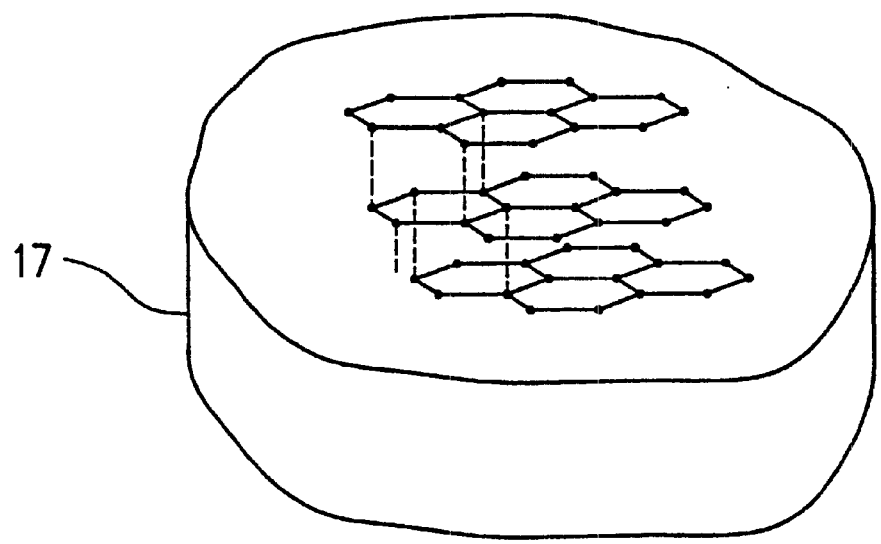
FIG. 8 is a view schematically showing a structure of a graphite particle.

As schematically shown in FIG. 8, on a circumferential surface 17 of a graphite particle, the carbon six-membered rings are not bonded to any other carbon six-membered ring (corresponding to the portions 15 in FIG. 7). The electrons are easily emitted from the circumferential surface 17. Accordingly, by applying the graphite particles 3 to the first electrode 2 at a high density and also in the state of being uniformly dispersed and thus causing the graphite particles 3 to act as the electron emitting section 24, an electron emitting device including the high density electron emitting section 24 can be realized. Even when an aggregate of graphite particles is used, a similar effect is obtained.

The electron emitting section 24 containing the graphite particles 3 or another carbon material having a carbon six-membered ring structure is preferably fixed to the first electrode 2.

In the above description, the first electrode 2 is a chromium electrode. The first electrode 2 preferably contains at least one element which can generate a carbon compound. Due to such a structure, a carbon compound is easily generated between the carbon material having a carbon six-membered ring structure and acting as the electron emitting section 24 and the first electrode 2. As a result, the electron emitting section 24 (particles 3 of an electron emitting material) can be fixed electrically and mechanically to the first electrode 2 strongly and stably. Consequently, the migration of the electrons from the first electrode 2 to the electron emitting section 24 is facilitated, and thus the electron emitting characteristics are improved.

EXAMPLE 2

Figure 9:
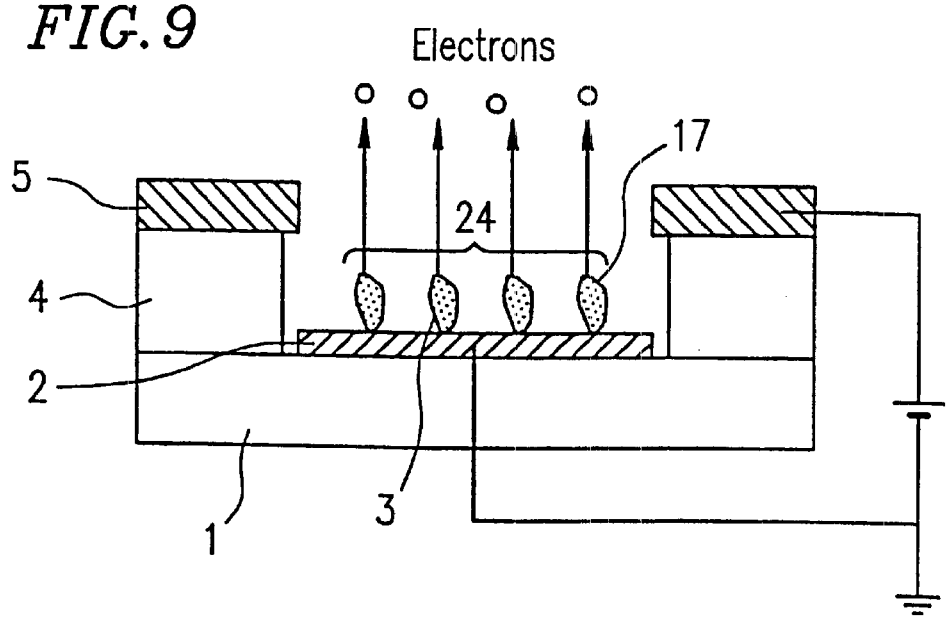
FIG. 9 is a view schematically showing a structure of an electron emitting device in a second example according to the present invention.

FIG. 9 shows a second example according to the present invention. The basic structure of the second example is identical with that of the first example, except that in the second example shown in FIG. 9, the graphite particles 3 applied on the chromium electrode 2 in a dispersed state and acting as the electron emitting section 24 are arranged so that the tips 17 (see FIG. 8). are directed toward the second electrode (aluminum electrode) 5 (upward and perpendicular to the chromium electrode 2), i.e., in the electron emitting direction.

As described above, graphite has a layer structure in which carbon six-membered rings are connected in a continuous chain, and the tips 17 of the graphite particles 3 correspond to the portions at which the carbon six-membered rings are not bonded to any other carbon six-membered ring (reference numeral 15 in FIG. 7). Accordingly, in the structure shown in FIG. 9 in which the tips 17 of the graphite particles 3 are directed toward the aluminum electrode 5 (upward and perpendicular to the chromium electrode 2, i.e., in the electron emitting direction), an electric field is concentrated to the portions at which the carbon six-membered rings are not bonded to any other carbon six-membered ring located at the tips 17 of the graphite particle 3, and thus the electrons are more easily emitted. For this reason, the electrons can be emitted at a lower voltage than in the first example.

Specifically with the electron emitting device in this example, when a potential difference of 30 V was applied between the chromium electrode 2 and the aluminum electrode 5, electron emission from the graphite particles 3 started. Then, when a potential difference of 50 V was applied, an electron emission density of about 30 $\mu A/mm^2$ could be confirmed. In the structure of this example, the particles 3 can be densely dispersed. Therefore, the number of points at which the electrons are emitted (also referred to as an "electron emitting sites") is increased and the uniformity in the distribution of the electron emitting sites is improved compared to in the first example.

Even when particles of a material other than graphite are used as particles acting as the electron emitting section 24, a similar effect to above can be obtained by arranging the particles so that portions of the particles through which the electrons are easily emitted are directed in the electron emitting direction as described above.

For example, when a carbon nanotubes described in the next example are used to form an electron emitting section 24, the carbon nanotubes can be arranged so that tips thereof are directed in the electron emitting direction.

EXAMPLE 3

Figure 10:
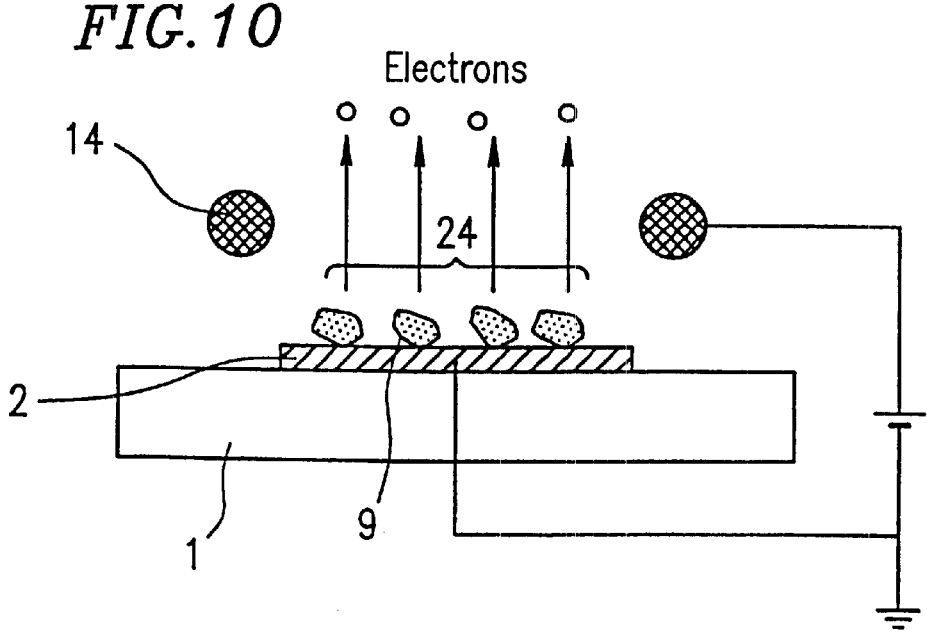
FIG. 10 is a view schematically showing a structure of an electron emitting device in a third example according to the present invention.

FIG. 10 schematically shows a structure of an electron emitting device in a third example according to the present invention.

Specifically in the structure shown in FIG. 10, reference numeral 1 represents a substrate (quartz glass substrate in this example), reference numeral 2 represents a first electrode (tungsten electrode in this example), reference numeral 24 represents an electron emitting section, and reference numeral 14 represents a mesh-like electrode acting as a second electrode. In this example, the electron emitting section 24 is formed of carbon nanotubes or carbon particles containing an aggregate of carbon nanotubes (carbon nanotube particles described below) 9.

Figure 11:
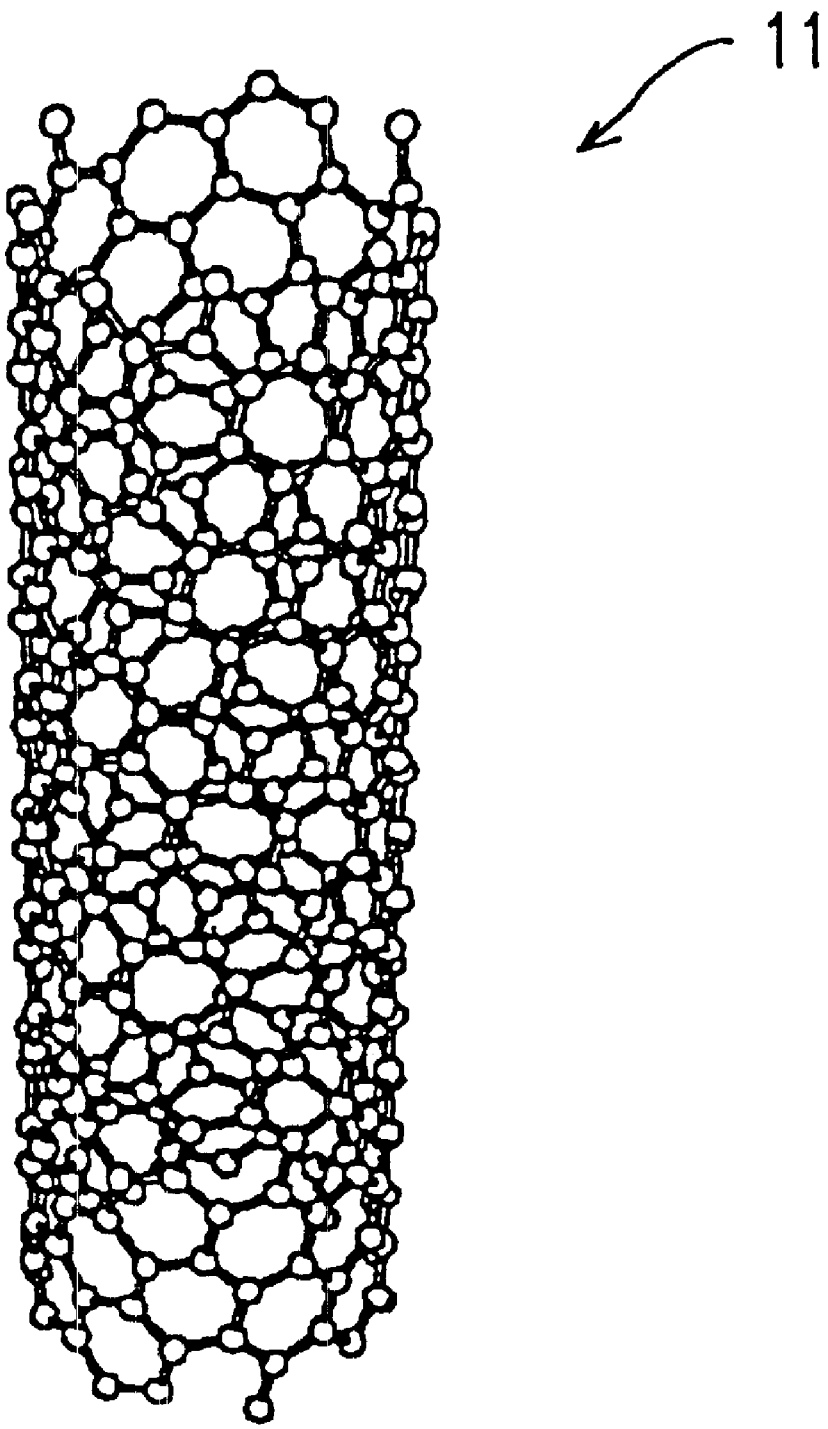
FIG. 11 is a view schematically showing a structure of a carbon nanotube.

As schematically shown in FIG. 11, a carbon nanotube 11 is a needle-like particle formed of carbon six-membered rings, and has a very large aspect ratio (particle length/particle diameter). Therefore, an electric field is likely to be concentrated to a tip of the carbon nanotube 11 and thus electrons are easily emitted through the tip. In order to realize efficient electron emission, the tip of the carbon nanotube 11 is more preferably opened as indicated by reference numeral 11b in FIG. 13 than being closed as a result of bond of carbon atoms as indicated by reference numeral 11a in FIG. 12.

The carbon nanotubes 11 can be formed by refining bulk carbon containing carbon nanotubes formed by arc discharge between carbon electrodes, or can be formed by a plasma CVD method utilizing a catalyst.

Figure 14:
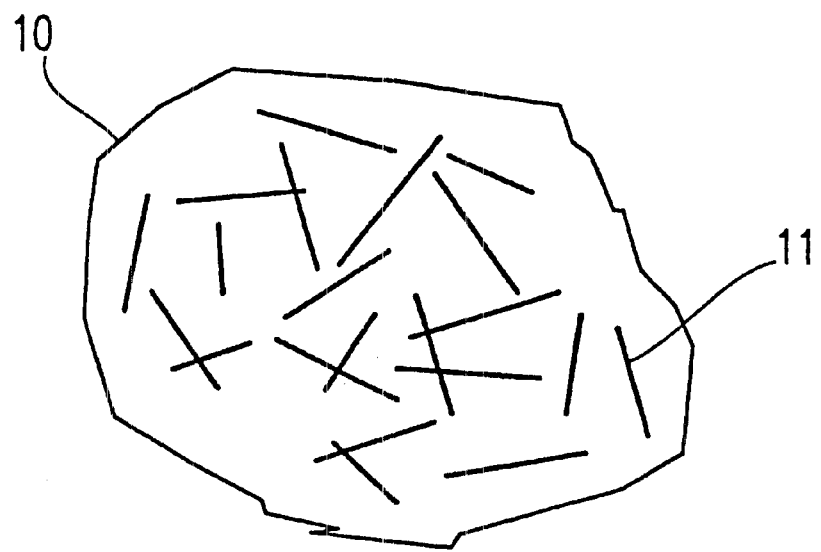
FIG. 14 is a view schematically showing a state of a carbon film containing carbon nanotubes.

A process for forming carbon nanotubes by arc discharge between carbon electrodes (not shown) will be described in more detail. Arc discharge is generated between carbon electrodes which are set in an 80 Torr helium atmosphere. By such setting, the carbon electrodes are partially deposited by sputtering to form a carbon film. As schematically shown in FIG. 14, the carbon film 10 formed in this manner contains carbon nanotubes 11 at a ratio of about 20%. These carbon nanotubes 11 typically have a needle-like structure having a diameter of 10 nm and a length of 2 to 3 $\mu$m. The component other than the carbon nanotubes 11 contained in the carbon film 10 is mostly carbon particles.

In this example, the resultant carbon film 10 containing the carbon nanotubes 11 is pulverized into particles, and the resultant particles are used as particles 9 of an electron emitting material forming the electron emitting section 24 shown in FIG. 10. In the following description, the particles 9 obtained in this manner will be referred to also as carbon nanotube particles 9.

The electron emitting device in this example is formed by a process described below.

As a first step, the tungsten electrode 2 having a thickness of 200 nm is formed on the quartz glass substrate 1 by an RF sputtering technique. Then, as a second step, 200 mg of carbon nanotube particles having an average particle size of 20 $\mu$m is mixed into 20 cc of a solution of isoamine acetate, and is uniformly dispersed in the solution by, for example, supersonic stirring or stirring using a rotation roller. At this point, the distribution density of the carbon nanotube particles is $6\times10^8/cm^2$. Then, as a third step, the resultant solution is applied to the tungsten electrode 2 by a spinner and left in a 300° C. atmosphere for 1 hour to be dried., Then, after drying, as a fourth step, a surface of the tungsten electrode 2 having the carbon nanotube particles applied thereto is exposed to a hydrogen gas plasma containing 1% of oxygen. The temperature of the quartz glass substrate 1 at this point is, for example, 700° C. As a fifth step, the mesh-like electrode 14 is located above and 50 $\mu$m away from the quartz glass substrate 1.

Figure 15:
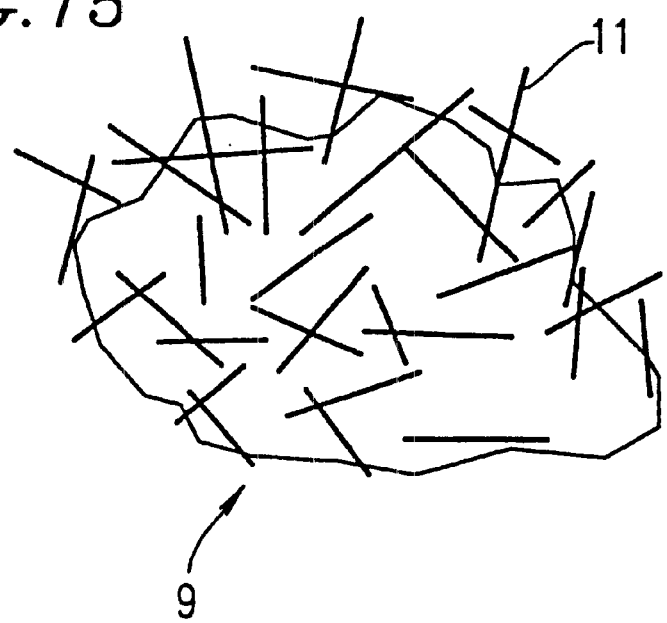
FIG. 15 is a view schematically showing a state of a particle containing carbon nanotubes.

The above-mentioned first through third steps are basically the same as the corresponding steps in the first example. In this example, however, in the fourth step, the surface of the dispersed carbon nanotube particles 9 is exposed to the hydrogen gas plasma containing 1% of oxygen at a high substrate temperature of 700° C. Under the conditions, carbon particles are more easily etched than the carbon nanotube particles 11. Therefore, as schematically shown in FIG. 15, the carbon nanotubes 11 partially project from the particle 9. As a result, a strong electric field is concentrated, to tips of the carbon nanotubes 11 and thus electrons are easily emitted through the tips.

Figure 12:
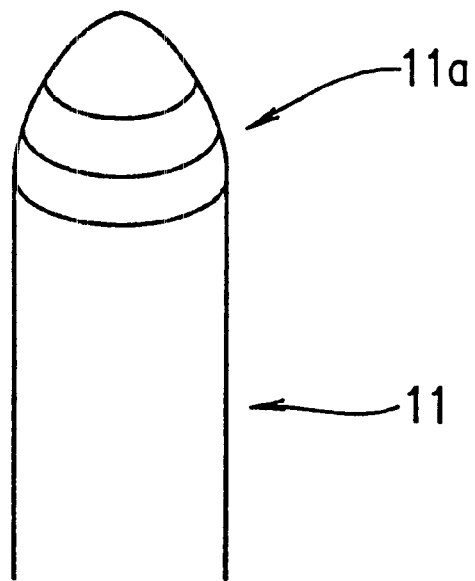
FIG. 12 is a view schematically showing a state of a carbon nanotube where a tip is closed.
Figure 13:
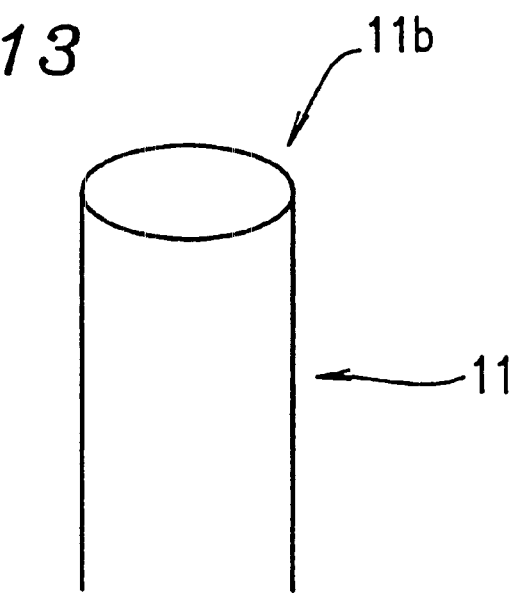
FIG. 13 is a view schematically showing a state of a carbon nanotube where a tip is opened.

The carbon nanotube 11 formed by arc discharge has a tip structure 11a which is closed as shown in FIG. 12. When the carbon nanotube 11 is exposed to a hydrogen gas plasma containing 1% of oxygen at a high temperature atmosphere of 700° C., the tip of the carbon nanotube 11 is etched and thus obtains a tip structure 11b which is opened as shown in FIG. 13. The open tip structure 11b corresponds to the state in which the carbon six-membered rings are not bonded to any other carbon six-membered ring. In such a state, electrons are easily emitted as described in the first example. The number of electron emitting sites is also increased.

By the above-described plasma treatment, tungsten carbide (WC) which is a carbon compound is formed at an interface between the carbon nanotube particles 9 and the tungsten electrode 2. This carbon compound fixes the carbon nanotube particles 9 to the tungsten electrode 2. As a result, the contact resistance between the carbon nanotube particles 9 and the tungsten electrode 2 is reduced, and thus the electrons are stably supplied. In order to generate such a carbon compound, the material of the first electrode 2 can be another materials such as, for example, silicon or titanium instead of tungsten. The first electrode 2 can be formed of a mixture of tungsten and copper or a mixture of tungsten and aluminum.

The electron emitting device including the electron emitting section 24 formed of the carbon nanotube particles 9 by the above-described process can stably emit a great number of electrons by application of a low voltage. Specifically, when a voltage of 50 V was applied to the mesh-like electrode 14, electron emission started. When a voltage of 70 V was applied, an electron emission density of 50 $\mu A/mm^2$ could be confirmed.

The atmospheric conditions under which the carbon nanotube particles 9 are exposed to a hydrogen plasma are not limited to the conditions described in this example. The amount of oxygen mixed to hydrogen during plasma treatment is preferably 0.1 atm % to 20 atm %. An amount of oxygen mixed of 0.1 atm % or less is not preferable for the following reasons. The etching effect is reduced and thus the structure in which the nanotubes 11 partially project from the particles 9 is difficult to obtain, and the tips of the carbon nanotubes 11 are unlikely to be opened. When the amount of oxygen mixed is 20 atm % or more, the etching effect is excessively strong and thus the control of the process conditions is difficult.

The optimum temperature of the substrate 1 during the plasma treatment changes in accordance with the plasma conditions. A substrate temperature of 200° C. or less is not preferable since the etching effect is drastically reduced. In the case where a material which can synthesize a carbon compound is used as the material of the first electrode 2, the substrate temperature is preferably maintained, at the lowest, at a temperature allowing generation of a carbon compound. A substrate temperature of 1000° C. or more is not preferably since the etching effect is excessively strong and thus the control of the process conditions is difficult.

In the above description of this example, the mesh-like electrode 14 is used as the second electrode, but the second electrode can instead have a shape as described in the first example.

The mesh-like electrode 14 described in this example is usable not only when the carbon nanotube particles 9 are used but when the electron emitting section 24 is formed of any other electron emitting material. The mesh-like electrode 14 is usable in the other examples of this specification.

EXAMPLE 4

Figure 16:
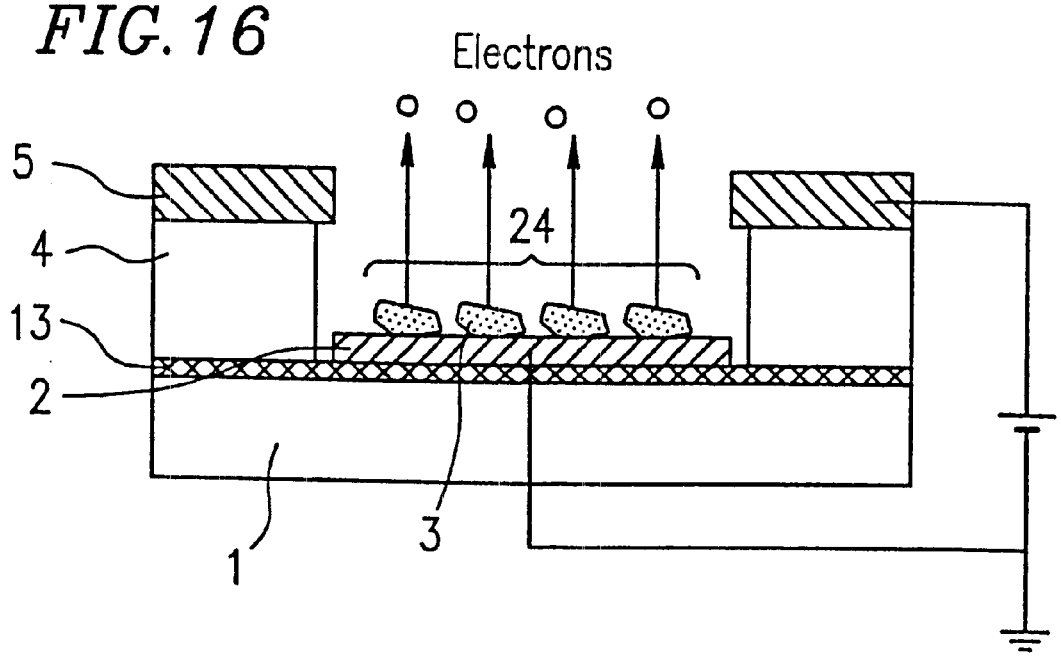
FIG. 16 is a view schematically showing a structure of an electron emitting device in a fourth example according to the present invention.

FIG. 16 schematically shows a structure of an electron emitting device in a fourth example according to the present invention.

Specifically in the structure shown in FIG. 16, reference numeral 1 represents a substrate (glass substrate in this example), reference numeral 2 represents a first electrode (aluminum electrode in this example), reference numeral 24 represents an electron emitting section, reference numeral 4 represents an insulating layer ($SiO_2$ layer in this example), reference numeral 5 represents a second electrode (aluminum electrode in this example), and reference numeral 13 represents a Si semiconductor layer. The electron emitting section 24 is formed of particles of an electron emitting material, for example, graphite particle 3.

In the electron emitting device in this example, the Si semiconductor layer 13 is formed on the substrate 1, and the first electrode 2 formed thereon substantially has a multiple layer structure. The electron emitting device having such a structure is produced by a process described below. The process is obtained by adding a step of forming the Si semiconductor layer 13 to the process described above with reference to FIGS. 3 through 6 in the first example.

First, the Si semiconductor layer 13 having a thickness of 250 nm (p type; specific resistance: $4 \times 10^6 \Omega \cdot cm$) is formed on the glass substrate 1 by a plasma CVD technique. Then, the aluminum electrode 2 having a thickness of 500 nm is formed on the Si semiconductor layer 13 by an RF sputtering technique. Then, 400 mg of graphite particles having an average particle size of 5 µm is mixed into 20 cc of a solution obtained by diluting isobutyl methacrylate with butyl carbitol, and is uniformly dispersed in the solution by, for example, supersonic stirring or stirring using a rotation roller. At this point, the distribution density of the graphite particles is $2 \times 10^7/cm^2$. The resultant solution is applied to the aluminum electrode 2 by a spinner and left in a 300° C. atmosphere for 1 hour to be dried. Thus, the graphite particles 3 adhere to the aluminum electrode 2. Then, after drying, a surface of the electrode having the graphite particles 3 applied thereto is exposed to a hydrogen plasma to remove excess organic material remaining on a surface of the graphite particles 3. Then, the $SiO_4$ layer 4 (thickness: 15 µm) and the aluminum electrode 5 (thickness: 0.1 µm) are sequentially formed by a sputtering technique, and a hole is formed at a prescribed position by etching. The aluminum electrode 2 having the graphite particles 3 adhering thereto is positioned in the hole.

In the case where at least a semiconductor layer or a high resistance layer such as the Si semiconductor layer 13 is provided on the substrate 1 and the first electrode 2 is formed thereon so that the first electrode 2 substantially has a multiple layer structure, the semiconductor layer or the high resistance layer suppresses generation of abnormal discharge and thus the level of the electric current emitted is stabilized.

Specifically, with the electron emitting device produced by the above-described process, when a voltage of 45 V was applied to the aluminum electrode 5, electron emission started. Then, when a voltage of 75 V was applied, an electron emission density of about 30 $\mu A/mm^2$ could be confirmed. At this point, no destruction of the device due to abnormal discharge or the like was found, and the emission current was highly stable. Without the Si semiconductor layer 13, an over time dispersion of the emission current of about 50% occurs. In this example, the over time dispersion in the emission current was 10% or less.

The above-described structure, in which at least one semiconductor layer or high resistance layer such as the Si semiconductor layer 13 is provided to cause the first electrode 2 to have a multiple layer structure, is usable in the other examples in this specification.

In the above descriptions of the examples, an electrode having an opening at the position corresponding to the electron emitting section or a mesh-like electrode is used as the second electrode. Instead, as described below, a planar electrode having no opening can be provided a prescribed distance away from the electron emitting section.

EXAMPLE 5

Figure 17:
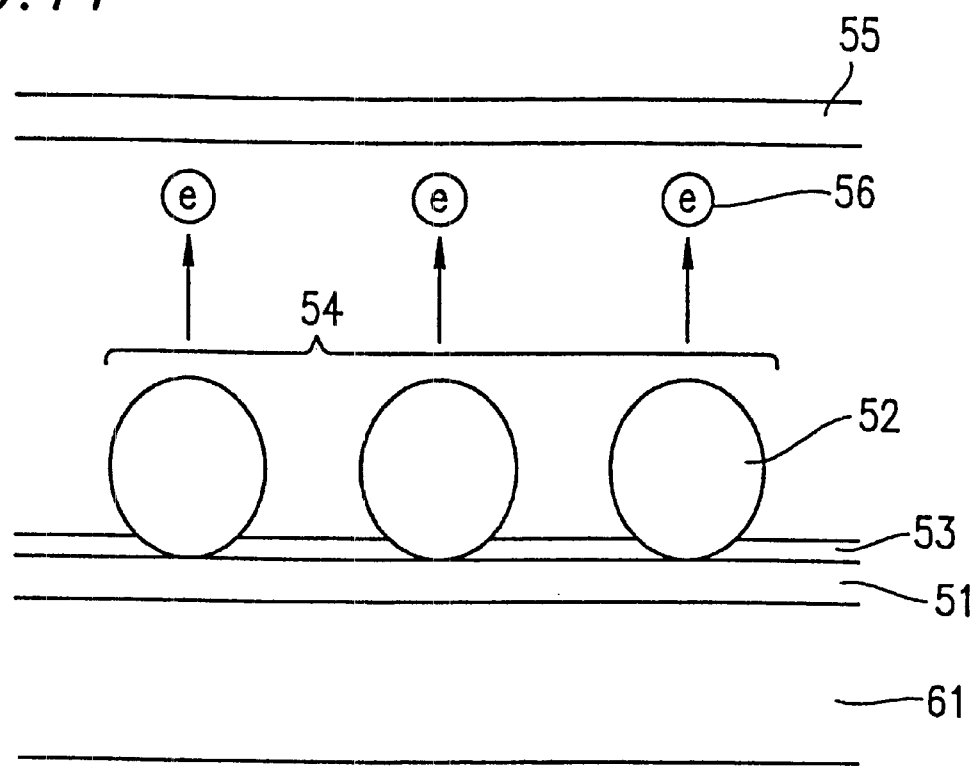
FIG. 17 is a view schematically showing a structure of an electron emitting device in a fifth example according to the present invention.

FIG. 17 is a cross-sectional view schematically showing a structure of an electron emitting device in a fifth example according to the present invention.

As shown in FIG. 17, in the electron emitting device in this example, a conductive layer 51 acting as a first electrode is formed on a substrate 61. Particles 52 of an electron emitting material are fixed to the conductive layer 51 by a fixing material 53, thus to form an electron emitting section 54. An electron extraction electrode (second electrode) 55 is located so as to oppose the substrate 61.

The structure shown in FIG. 17 is generally referred to as a diode structure. In an electron emitting device having this structure, a voltage is applied to the electron extraction electrode 55 so as to concentrate an electric field to the particles 52 forming the electron emitting section 54, and electrons 56 are emitted from the particles 52.

In order to emit the electrons 56 from the electron emitting section 54 uniformly in terms of time and space, the particles 52 forming the electron emitting section 54 need to be applied and caused to adhere to the conductive layer (first electrode) 51 with certainty, uniformly and at a high density. In this example, the particles 52 are fixed by the fixing material 53 and therefore a very stable adhesion state can be guaranteed.

Figure 18:
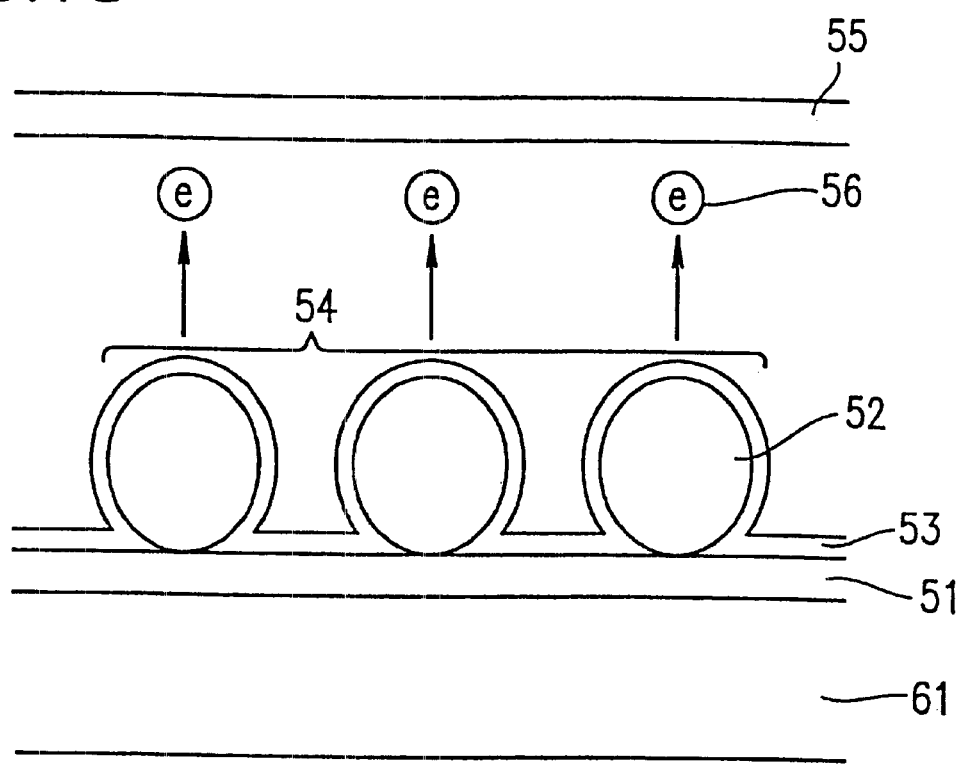
FIG. 18 is a view schematically showing another structure of an electron emitting device in the fifth example according to the present invention.

FIG. 17 shows the state in which the fixing material 53 exists only in the vicinity of the conductive layer 51 and the particles 52. The location of the fixing material 53 is not limited to this. For example, as shown in FIG. 18, the fixing material 53 can exist on a surface of the particles 52. It should be noted that when a part of the surface in the vicinity of an actual electron emitting point (electron emitting site) is covered with the fixing material 53 which exists on the surface of the particles 52, it is difficult to emit the electrons. Accordingly, it is preferable that at least a part of the surface in the vicinity of the electron emitting point (electron emitting site) of each particle 52 (in the vicinity of a top end of the particle 52 in the structure shown in FIG. 18) is exposed without being covered with the fixing material 53.

Figure 24:
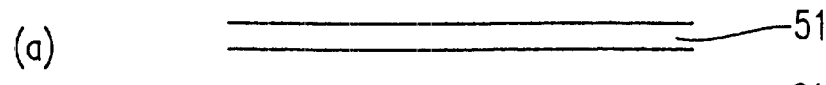
FIGS. 24(*a*) through (*d*) are views illustrating steps of a production process of an electron emitting device according to the present invention.
Figure 24:
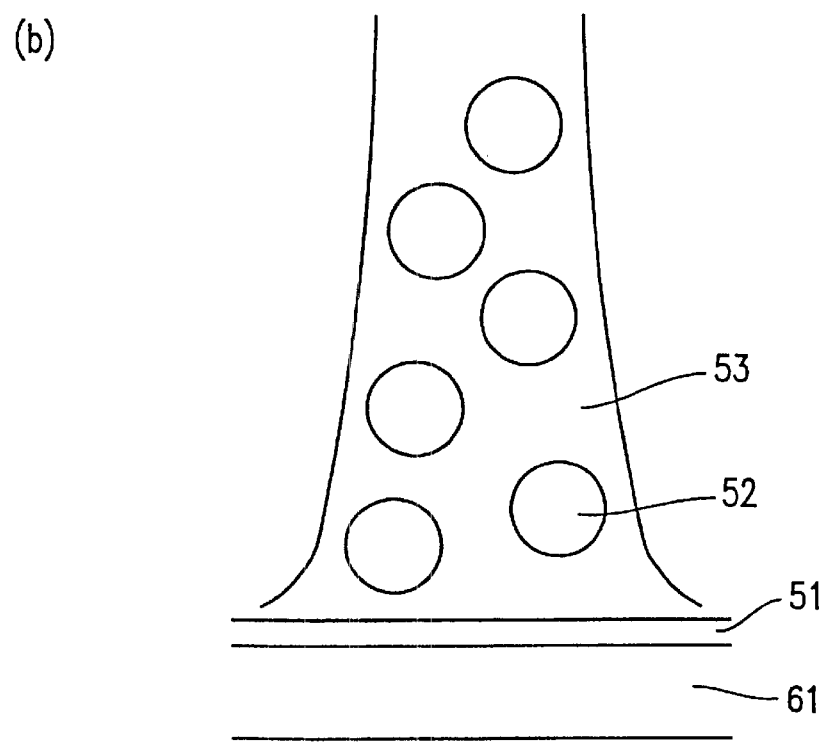
Figure 24:
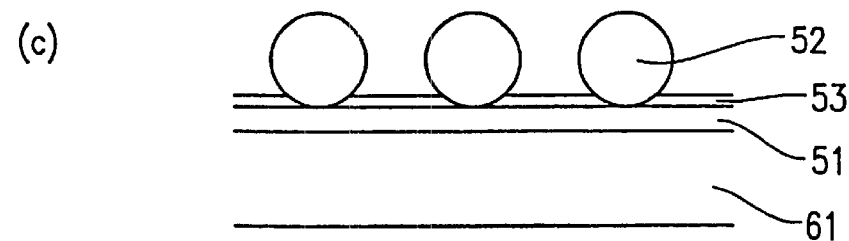
Figure 24:
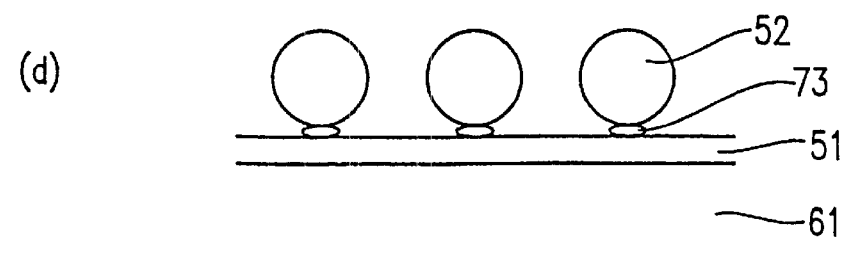

As shown in FIG. 24(d) below regarding this point, it is preferable that the fixing material on the surface of the particles 52 of the electron emitting material is removed to guarantee the electron emitting characteristics inherent in the electron emitting material, while a sufficient amount of fixing material 73 remains between the conductive layer 51 and the particles 52 to guarantee a sufficient level of fixation. Such a state is realized by using a vehicle as the fixing material 53. A vehicle is a material often used in fluorescent material application. The vehicle is preferable as the fixing material 53 for the reasons that the vehicle has been advantageously used in vacuum and can realize the above-mentioned state.

The particles 52 of the electron emitting material forming the electron emitting section 54 can be independent from one another or can be partially aggregated. The conductive layer 51, which acts as an electrode for supplying electrons to the particles 52 forming the electron emitting section 54, can be formed of a conductive thin film or thick film of, for examples, usual metals. The effect of the present invention is obtained whether the conductive layer 51 has a single layer structure of a multiple layer structure. When structurally permitted, a layer acting both as the substrate 61 and the conductive layer 51 can be provided.

By causing the particles 52 of the electron emitting material to adhere to the conductive layer 51 by the fixing material 53 as described above, the conductive layer (electrode) 51 as the electron source and the particles 52 are fixed together with certainty to improve the reliability. Moreover, an ohmic contact is established between the two, and thus electron injection from the conductive layer 51 to the particles 52 is performed in a satisfactory manner.

When a triode structure is adopted for the electron emitting section 54 instead of the diode structure, a similar effect is obtained. In the triode structure, a electron extraction electrode having an opening at a position corresponding to the electron emitting section 54 is provided a prescribed distance. away from the electron emitting section 54.

EXAMPLE 6

Figure 19:
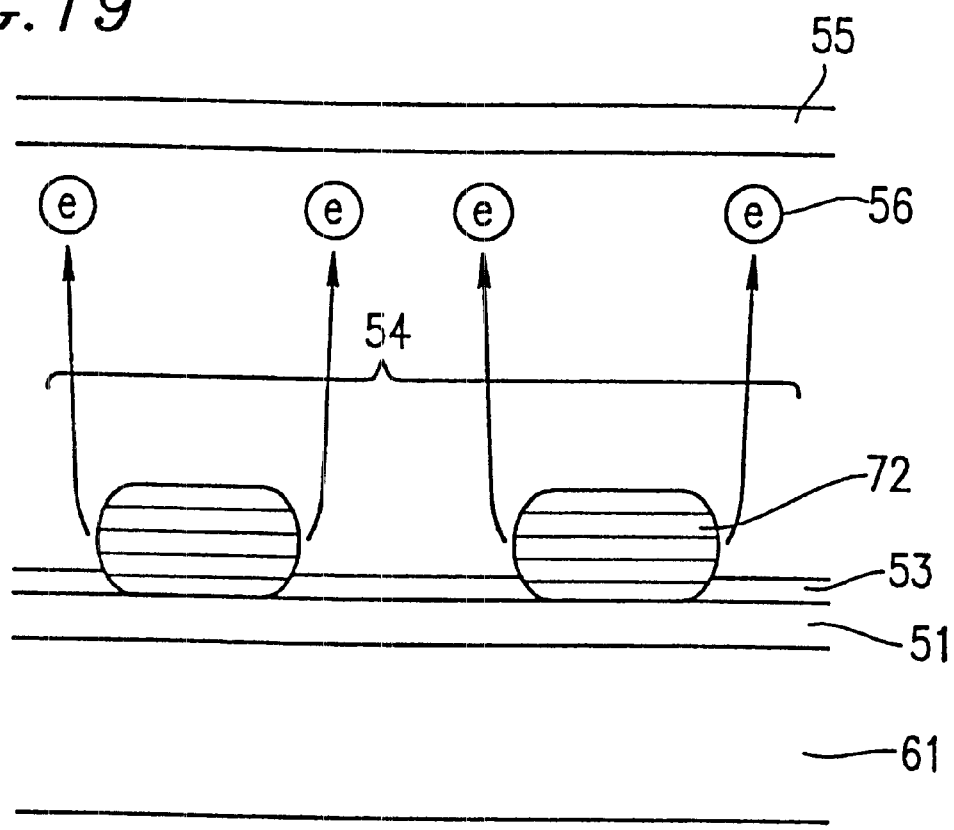
FIG. 19 is a view schematically showing a structure of an electron emitting device in a sixth example according to the present invention.

FIG. 19 is a cross-sectional view schematically showing a structure of an electron emitting device in a sixth example according to the present invention. In this example, graphite particles 72 are used as the particles of an electron emitting material forming the electron emitting section 54 described in the fifth example.

With reference to FIG. 19, in the electron emitting device in this example, a conductive layer (electrode) 51 is formed on a substrate 61. Graphite particles 72 are fixed to the conductive layer 51 by a fixing material 53, thus to form an electron emitting section 54. An electron extraction electrode 55 is located so as to oppose the substrate 51.

The structure shown in FIG. 19 is also generally referred to as a diode structure. In an electron emitting device having this structure, a voltage is applied to the electron extraction electrode 55 so as to concentrate an electric field to the graphite particles 72 forming the electron emitting section 54, and electrons 56 are emitted from the graphite particles 72.

Figure 20:
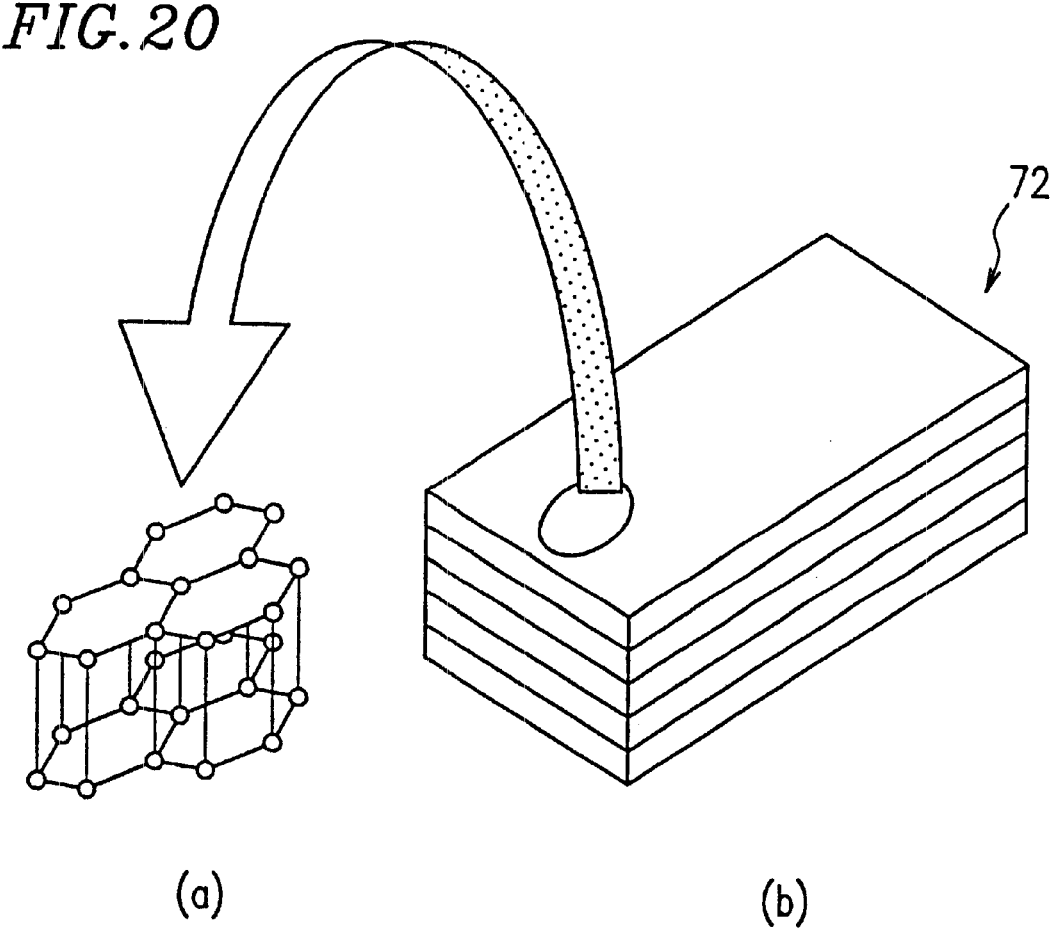
FIGS. 20(*a*) and (*b*) are views schematically showing a microscopic structure and a macroscopic structure of graphite, respectively.

FIG. 20(b) schematically shows a macroscopic view of a graphite particle 72. Microscopically, as schematically shown in FIG. 20(a), two-dimensional expansions of carbon six-membered ring structures are stacked in layers. As described above regarding the first example, a portion at which a σ bond of carbon six-membered rings has been broken (in the microscopic structure) is exposed on an end surface of the graphite particle 72. Accordingly, it has been found by experiments that when an electric field is concentrated to the graphite particles 72, a great number of electrons are emitted from the exposed portion at which the a bond has been broken (from ends of the graphite particles as schematically shown in FIG. 19 by arrows, which indicates the emission paths of the electrons 56).

Hereinafter, the results of the experiments performed by the present inventors on the electron emission from graphite particles will be described.

Specifically, an electron emitting device having the above-described diode structure was used. A voltage was applied to the electron emitting device so as to obtain an electric field strength of 10 V/$\mu$m in an atmosphere having a vacuum degree on the order of $10^{-7}$ Torr, and the emission current was measured. When graphite particles were used as the electron emitting material forming the electron emitting section, an emission current on the order of microamperes was obtained. By contrast, when Cu, Al or $TiO_2$ was used as the electron emitting material, an emission current only on the order of nanoamperes was obtained in each case under the same conditions. As can be appreciated, more efficient electron emission can be realized by using graphite particles as the electron emitting material.

The portion in a graphite particle at which the a bond of carbon six-membered rings has been broken can be naturally occurring or formed in post-treatment.

Figure 21:
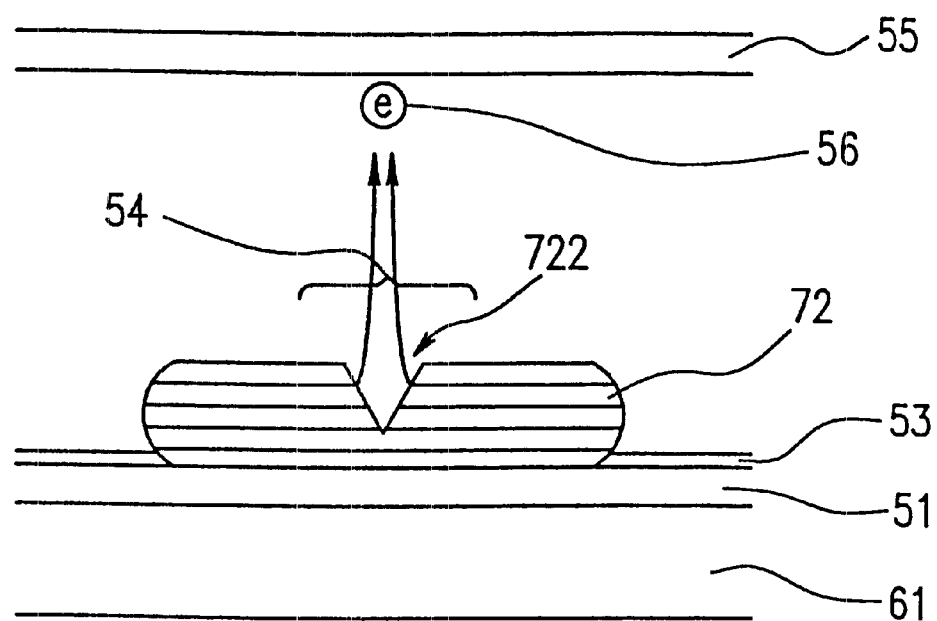
FIG. 21 is a view schematically showing another structure of an electron emitting device in the sixth example according to the present invention.

FIG. 21 shows a structure altered from the structure shown in FIG. 19. The graphite particle 72 is located so that the normal to the direction in which layers of the carbon six-membered rings are laid is substantially perpendicular to the surface of the conductive layer (electrode) 51. The graphite particle 72 has a concave portion (cut-out portion) 722 in a surface (top surface) thereof. A portion at which the a bond is broken is exposed at the concave portion 722. Thus, electrons are easily emitted through the concave portion 722. An area in the vicinity of the concave portion 722 substantially acts as the electron emitting section 54. In the case where the concave portion 722 is selectively formed on the surface of the graphite particles 72, electron emission can be selectively performed.

When highly oriented graphite having a highly oriented carbon six-membered ring structure is used for the graphite particles 72 in the structure shown in FIG. 21 having the concave portion 722, the above-described effect is provided more conspicuously. In the experiment performed by the present inventors, a groove (cut-out portion) was formed in a surface of a graphite sheet known by the trade name "Super Graphite" with a knife, and an electron emitting state from that portion was measured. It was confirmed that electrons were emitted from the groove as well as from end surfaces of the graphite sheet.

A similar effect can be obtained when the concave portion 722 on the surface of the graphite particle 72 is formed chemically instead of mechanically.

Figure 22:
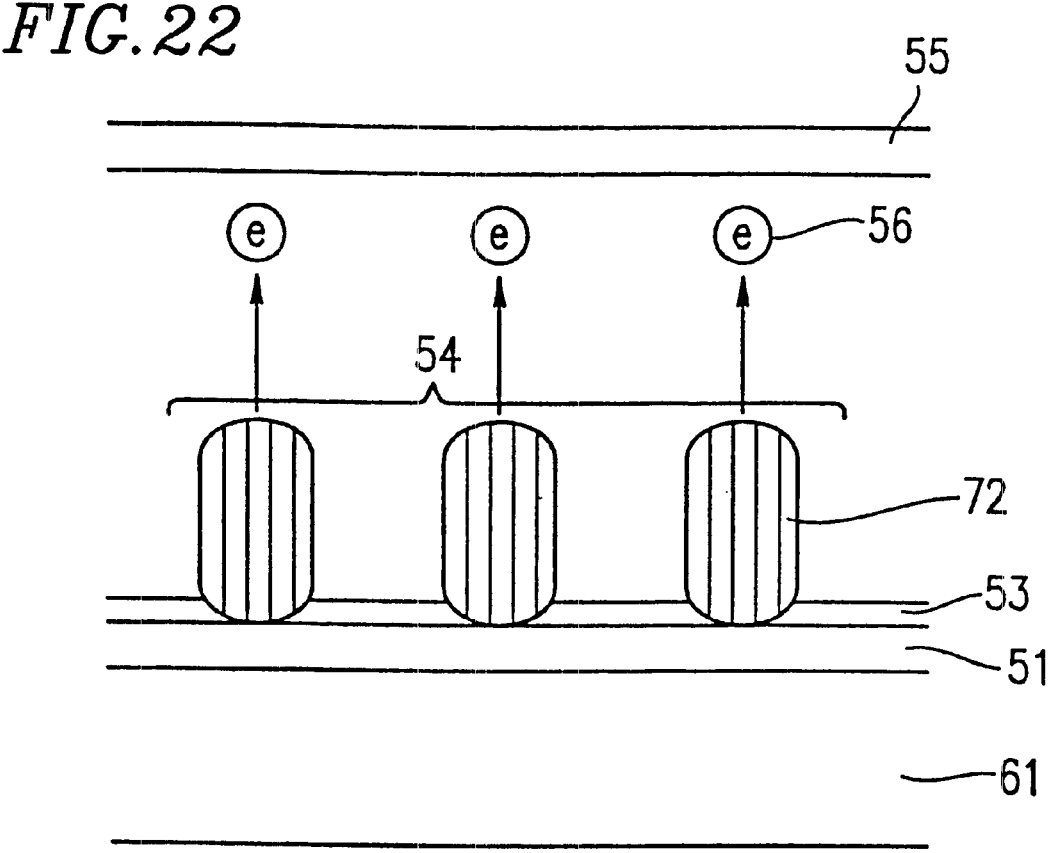
FIG. 22 is a view schematically showing still another structure of an electron emitting device in the sixth example according to the present invention.

In a structure shown in FIG. 22, the graphite particles 72 are arranged so that end surfaces of the graphite particles 72 are directed toward the electron extraction electrode 55 (i.e., so that the normal to the direction in which layers of the carbon six-membered rings in the graphite particle are laid is substantially parallel to the surface of the conductive layer (electrode) 51. The graphite particles 72 are then fixed to the conductive layer 51 with the fixing material 53.

A graphite particle often has a flat shape as schematically shown in FIG. 20(b) due to the microscopic stacking structure shown in FIG. 20(a). Therefore, when the graphite particles 72 are applied to the conductive layer 51, the normal to the direction in which layers of the carbon six-membered rings are laid is often substantially parallel to the normal to the surface of the conductive layer 51. In such a case, the end surfaces of the graphite which most contribute to the electron emission are not opposed to the electron extraction electrode 55. Therefore, the concentration of an electric field on a portion at which the a bond of carbon six-membered rings is broken and which is exposed on the end surface is inefficient.

By contrast, when the end surfaces of the graphite particles 72 are directed to the electron extraction electrode 55 (i.e., arranged so that the normal to the direction in which layers of the carbon six-membered rings are laid is substantially parallel to the surface of the conductive layer (electrode) 51) as shown in FIG. 22, an electric field can be concentrated to the end surfaces. Thus, the electron emitting efficiency can be improved.

When highly oriented graphite having a highly oriented carbon six-membered ring structure is used for the graphite particles 72 in the structure shown in FIG. 22, the above-described effect is provided more conspicuously.

Figure 23:
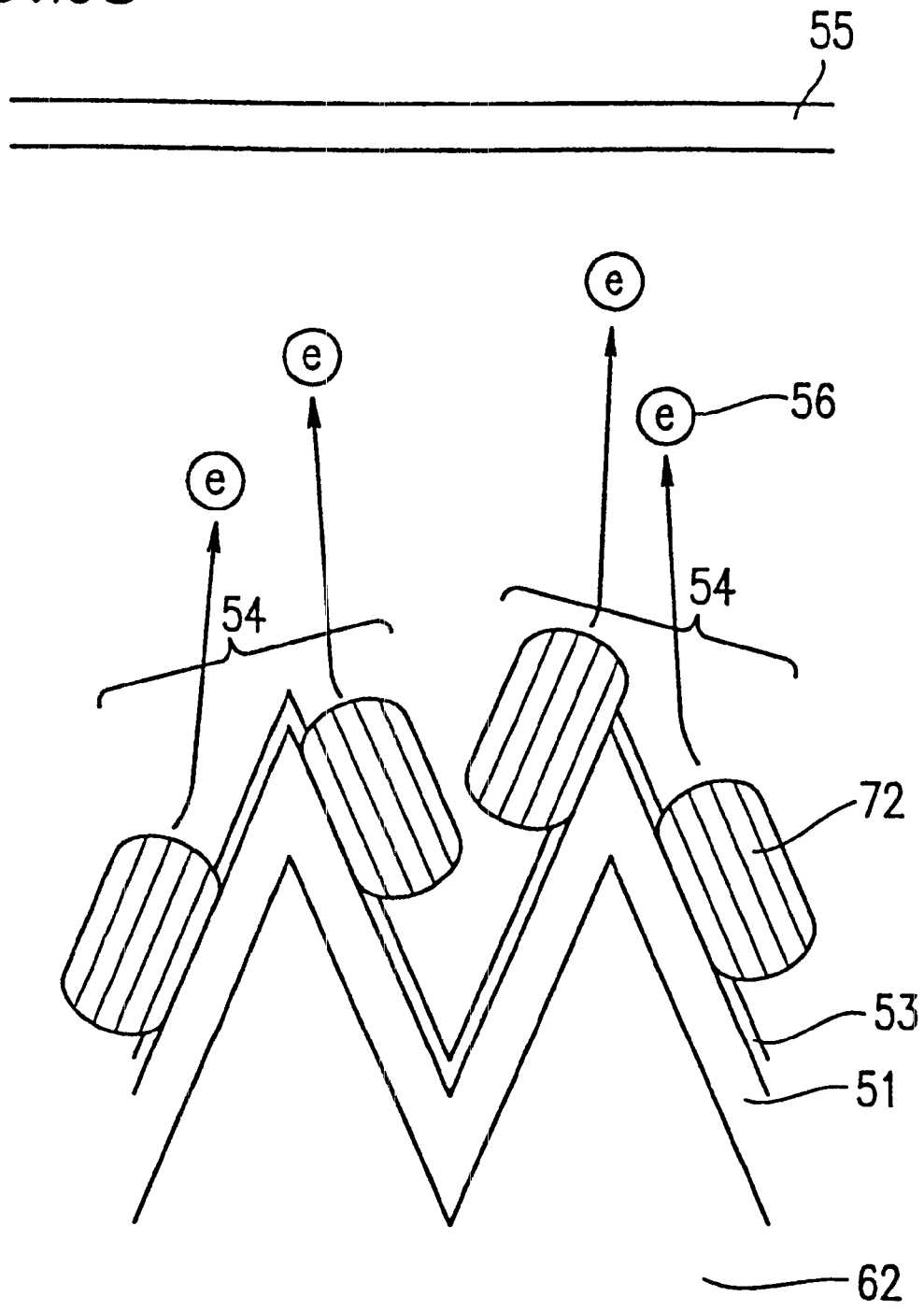
FIG. 23 is a view schematically showing yet another structure of an electron emitting device in the sixth example according to the present invention.

In a structure shown in FIG. 23, a substrate 62 having a surface having a rugged pattern is used instead of the substrate 61 shown in FIG. 19. The conductive layer 51 is provided on the rugged pattern. The graphite particles 72 as the electron emitting material are provided along the rugged pattern, and the electron extraction electrode 54 is provided above the graphite particles 72.

In such a structure, the graphite particles 72 are fixed along the rugged pattern of the substrate 62, and unavoidably are fixed so that the end surfaces thereof are directed toward the electron extraction electrode 55. Due to such a structure, the end surface of each graphite particle 72, on which the portion at which the a bond of carbon six-membered rings is broken is exposed, is opposed to the electron extraction electrode 55. Therefore, an electric field is efficiently concentrated, thus improving the electron emitting efficiency. In the structure shown in FIG. 23 also, use of highly oriented graphite having a highly oriented carbon six-membered ring structure for the graphite particles 72 provides the above-described effect more conspicuously.

The technique for forming the rugged pattern can be appropriately selected from known techniques for roughening the substrate surface, such as etching, blasting and the like. A similar effect can be obtained by forming a conductive layer on a flat substrate surface and then directly forming a rugged pattern on a surface of the conductive layer, instead of forming a conductive layer on a rugged pattern of the substrate surface (i.e., indirectly forming the rugged pattern on the conductive surface).

When a triode structure is adopted for the electron emitting section 54 instead of the diode structure, a similar effect is obtained. In the triode structure, a electron extraction electrode having an opening at a position corresponding to the electron emitting section 54 is provided a prescribed distance away from the electron emitting section 54.

Figure 30:
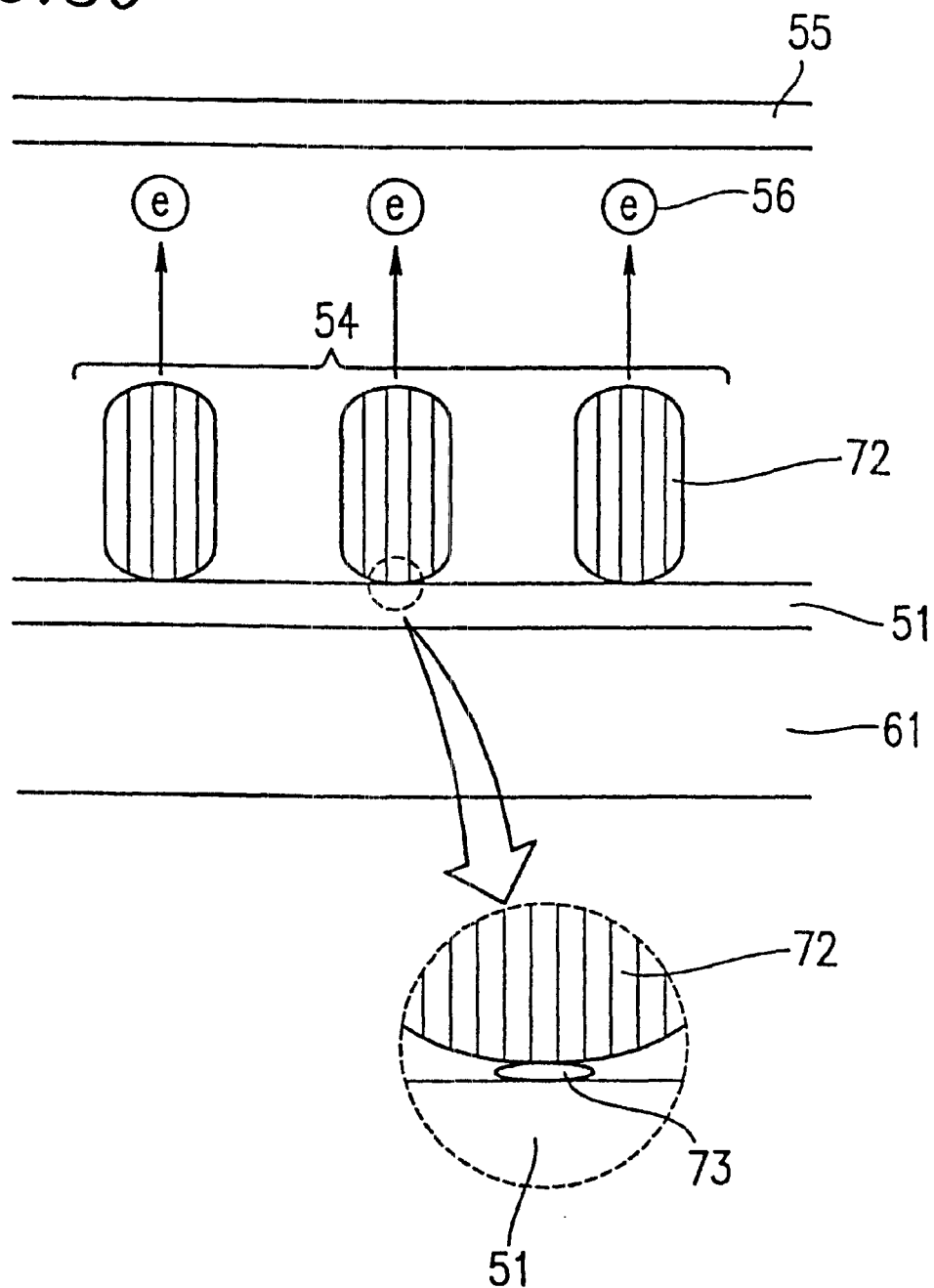
FIG. 30 is a view schematically showing yet another structure of an electron emitting device in the sixth example according to the present invention.

In the above description, the state of the fixing material 53 is not limited to the state specifically illustrated in the figures. The fixing material 53 can exist in any other form as long as the actual electron emitting points from the graphite particles 72 are not covered with the fixing material 53. As schematically shown in FIG. 30, for example, it is preferable that the fixing material on the surface of the particles 72 of an electron emitting material is removed to guarantee the electron emitting characteristics inherent in the electron emitting material, while a sufficient amount of fixing material 73 remains between the conductive layer 51 and the particles 72 to guarantee a sufficient level of fixation shown in the magnification circle in FIG. 30. Such a state is realized by using a vehicle, which is a material often used in fluorescent material application, as the fixing material 53.

EXAMPLE 7

In this example, an exemplary process, for producing an electron emitting device, including a preferred step of applying the fixing material described above will be explained.

In order to easily apply the fixing material 53, it is preferable to apply a solution containing particles 52 acting as an electron emitting material mixed therein by a spin-coating technique, a printing technique or the like. By such a method, the uniformity of applying the fixing material is significantly improved, and the applied state is uniform and highly dense due to the appropriate viscosity of the solution. As a result, a uniform and stable electron emission state can be obtained.

With reference to FIGS. 24(a) through (c), a specific process of application will be described.

First, as shown in FIG. 24(a), the conductive layer 51 is formed on the substrate 61. Next, as shown in FIG. 24(b), a mixture solution of the particles 52 of the electron emitting material and the fixing material 53 is dropped and applied on the resultant conductive layer 51 and then is dried. Thus, as shown in FIG. 24(c), the particles 52 are fixed to the conductive layer 51. As a result, the particles 52 can adhere to the conductive layer 51 at a high density, uniformly and stably. The emission current can be uniform and stable in this manner.

Figure 25:
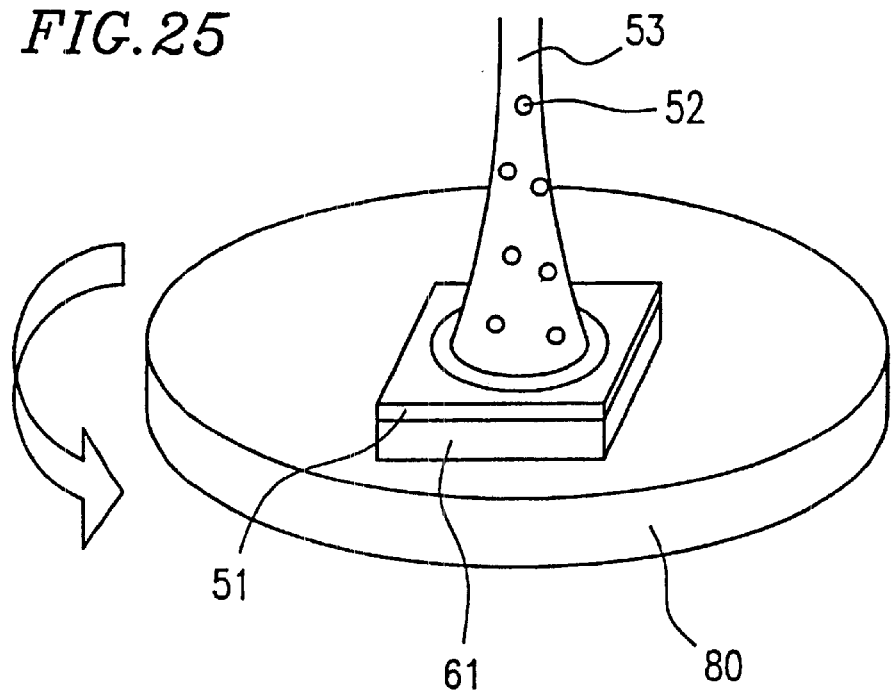
FIG. 25 is a view illustrating one step of another production process of an electron emitting device according to the present invention.

In the case where, as shown in FIG. 25, the substrate 61 having the conductive layer 51 formed thereon is put on a rotation table 80 and the mixture solution of the particles 52 and the fixing material 53 is dropped and applied while the rotation table 80 is rotated (so-called spinner application), the application uniformity of the particles 52 is further improved.

Regarding the application of the fixing material 53, it is important to prevent the fixing material 53 from remaining in a part of a surface of the particles 52 in the vicinity of the electron emitting sites while guaranteeing the fixation of the particles 52 to the conductive layer 51. In the case where the method of applying a mixture of the particles 52 of the electron emitting material and the fixing material 53 is adopted, it is especially preferable that the fixing material 53 fulfills the above-described requirements.

In the case where, for example, a vehicle which is a material often used in fluorescent material application is used as the fixing material 53 as described above, the properties which the fixing material 53 should have can be obtained with certainty.

When the vehicle is used as the fixing material, the following steps are specifically performed. After the step of application shown in FIG. 24(b), the resultant layers are dried at about 400° C. for 1 hours. As a result, as shown in FIG. 24(d), the fixing material (vehicle) on the surface of the particles 52 of the electron emitting material is removed. Thus, the electron emitting characteristics inherent in the electron emitting material are guaranteed. Moreover, a sufficient amount of fixing material (vehicle) 73 remains between the conductive layer 51 and the particles 52 to guarantee a sufficient level of fixation.

In the case where the fixing material on the surface of the particles cannot be removed by drying or heat treatment, the fixing material in an unnecessary portion is removed by post-treatment such as, for example, plasma treatment. The particles are preferably of a material which is unlikely to be damaged by post-treatment. For example, a carbon material, which has a high resistance against sputtering, is unlikely to be damaged by the post-treatment such as plasma treatment.

EXAMPLE 8

Figure 26:
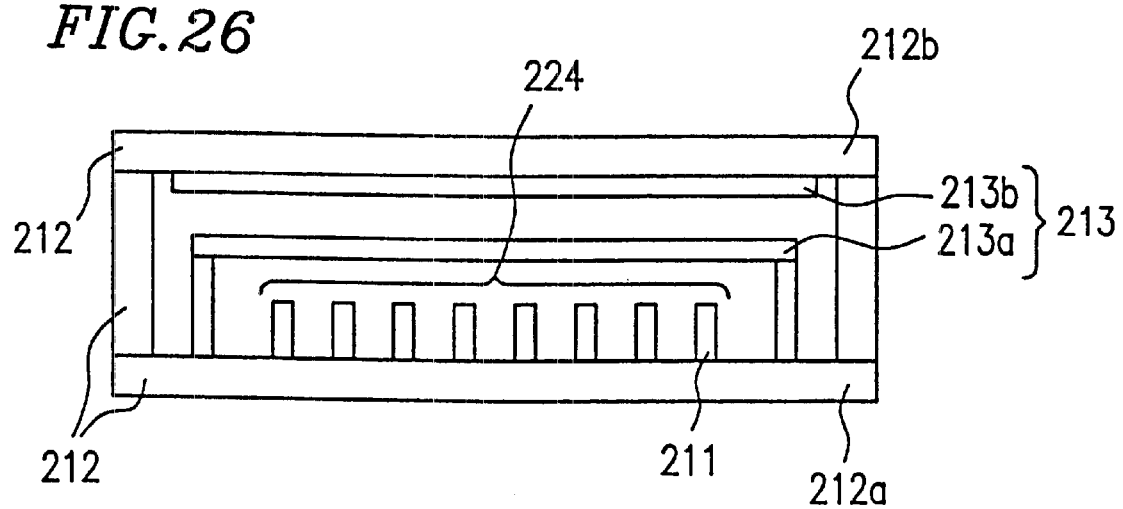
FIG. 26 is a cross-sectional view schematically showing a structure of an image display apparatus in an eighth example according to the present invention.

FIG. 26 is a schematic cross-sectional view of an image display apparatus in an eighth example according to the present invention.

Specifically in FIG. 26, a plurality of electron emitting devices 211 according to the present invention are formed on a substrate 212a also acting as a part of an enclosure 212. The plurality of electron emitting devices 211 form an electron emitting source 224. Reference numeral 213 represents an image forming section. The image forming section 213 includes an electron driving electrode 213a for performing driving and control such as acceleration, deflection, modulation and the like of electrons from the electron emitting devices 211, and a fluorescent member 213b applied on an inner surface of a part 212b of the enclosure 212. The fluorescent member 213b is caused to emit light by the driven electrons, thus to display an image. Although not specifically shown in the figure, a circuit for supplying an input signal to each of the plurality of electron emitting devices 211 is further provided. Due to the circuit, emission of the electrons from the plurality of electron emitting devices 211 is controlled in accordance with the input signal to each of the electron emitting devices 211.

Since the electron emitting devices according to the present invention are used for the electron emitting source 211, an emission current can be extracted at a low voltage and stably in terms of time and space. Therefore, the resultant image display apparatus is of a high quality.

FIGS. 27(a) through (d) show a schematic process for producing an image display apparatus in this example.

Figure 27:
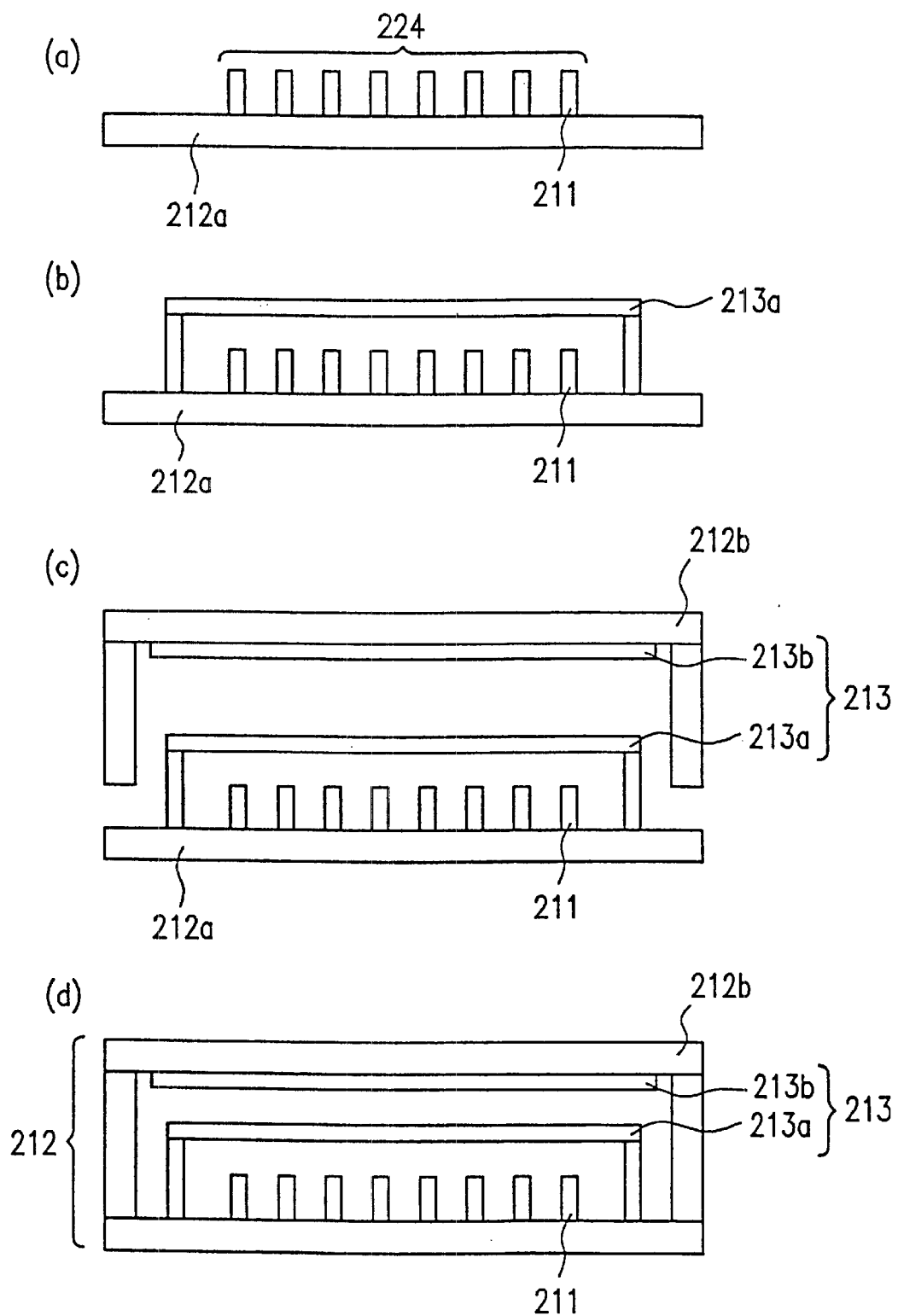
FIGS. 27(*a*) through (*d*) are views illustrating steps of a production process of the image display apparatus shown in FIG. 26.

First, as shown in FIG. 27(a), a plurality of electron emitting devices 211 according to the present invention are formed on the substrate 212a also acting as a part of the enclosure 212, so that the electron emitting devices 211 form the electron emitting source 224. The electron driving electrode 213a as a part of an image forming section 213 is provided (FIG. 27(b)), and the part 212b of the enclosure having the fluorescent member 213b applied on an inner surface is provided (FIG. 27(c)). Finally, the inside of the enclosure 212 is made a vacuum to obtain the image display apparatus in this example as shown in FIG. 26 (FIG. 27(d)).

In this manner, an image display apparatus using an electron emitting device according to the present invention, which has a high quality, can be produced.

EXAMPLE 9

Figure 28:
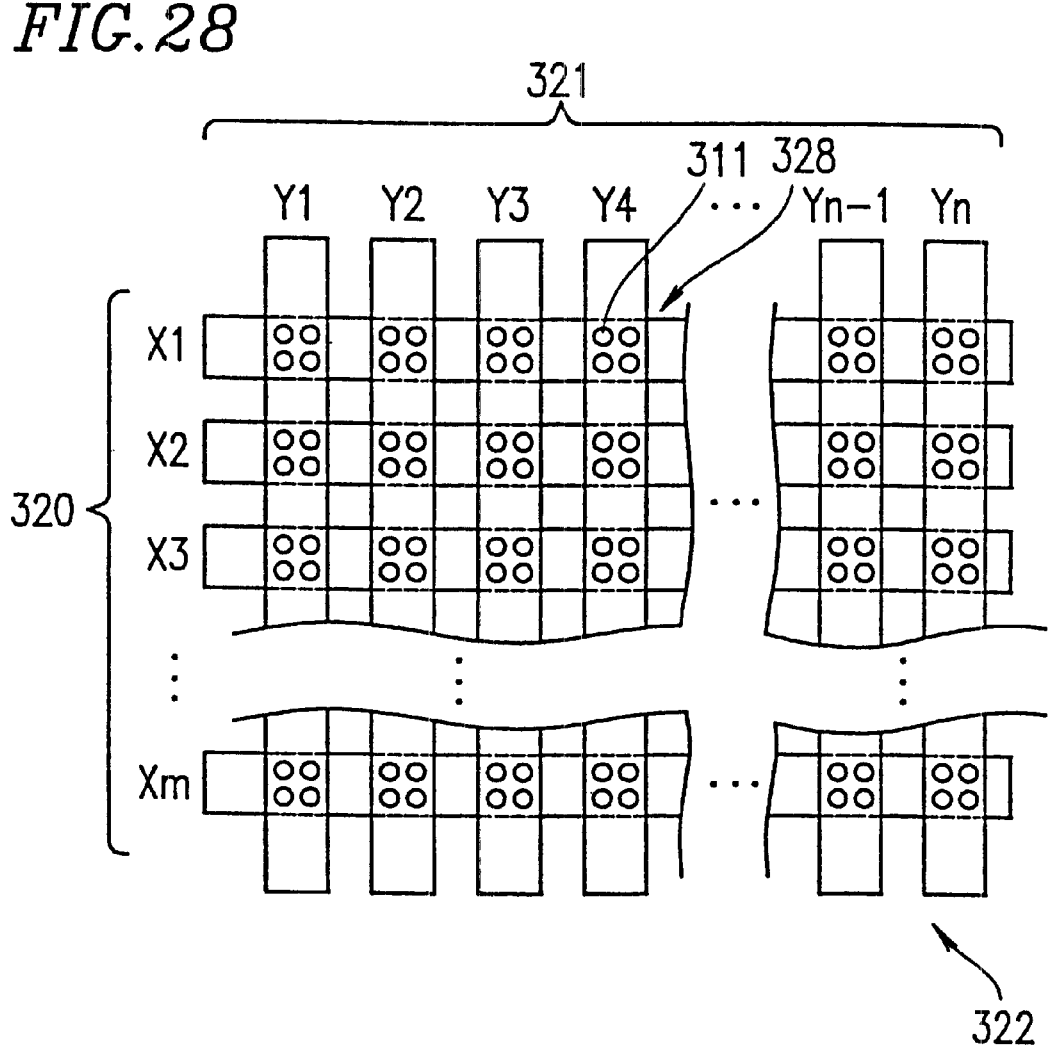
FIG. 28 is a view schematically showing a structure of an electron emitting. source in a ninth example according to the present invention.

In a ninth example according to the present invention, an electron emitting source including a plurality of electron emitting devices according to the present invention described above will be explained. FIG. 28 schematically shows a structure of an electron emitting source 322 in this example.

In the electron emitting source 322, a plurality of X direction lines X1 through Xm (comprehensively indicated by reference numeral 320) are electrically insulated from one another, and a plurality of Y direction lines Y1 through Yn (comprehensively indicated by reference numeral 321) are electrically insulated from one another. The X direction lines 320 and the Y direction lines 321 are located perpendicular to each other. Each two adjacent X direction lines X1 through Xm have a distance of about 50 $\mu$m therebetween, and each two adjacent Y direction lines Y1 through Yn have a distance of about 50 $\mu$m therebetween. At each of intersections 328 of the X direction lines 320 and the Y direction lines 321, a plurality of electron emitting sections 311 containing carbon having a carbon six-membered ring structure are located on the X direction lines 320, so that electron emitting devices according to the present invention can be formed at each of the intersections 328. In this manner, the electron emitting source 322 in this example, including a plurality of electron emitting devices (hereinafter, indicated by reference numeral 328 used for the intersections) which are arranged two-dimensionally and connected to form a simple matrix, is obtained.

The number of the X direction lines 320 and the Y direction lines 321 (i.e., the value of m and n) is not particularly limited. The value of m and the value of n can be the same as, for example, 16×16, or can be different from each other.

In the electron emitting source 322 having a structure shown in FIG. 28, the total amount of electron emission can be controlled using a voltage applied to the Y direction lines 321 as an input signal. By changing the voltage value applied to each of the electron emitting devices 328, the amount of electron emission can be modulated.

The electron emitting source 322 in FIG. 28 has a higher efficiency of electron emission and a smaller over time change of the amount of electron emission than the conventional structure. When an input signal having a distribution in the X direction and the Y direction is supplied to the electron emitting devices 328 arranged two-dimensionally as in FIG. 28, the electron emission distribution corresponding to the distribution of the input signal is obtained.

The electron emitting source 322 in this example, which includes a great number of high efficient electron emitting devices 328, provides a large electron emission current by application of a small amount of power. The electron emitting source 322 also allows an electron emitting area to be set larger. Since the amount of electron emission from each electron emitting device 328 can be controlled in accordance with the input signal, an arbitrary electron emission distribution can be obtained.

EXAMPLE 10

Figure 29:
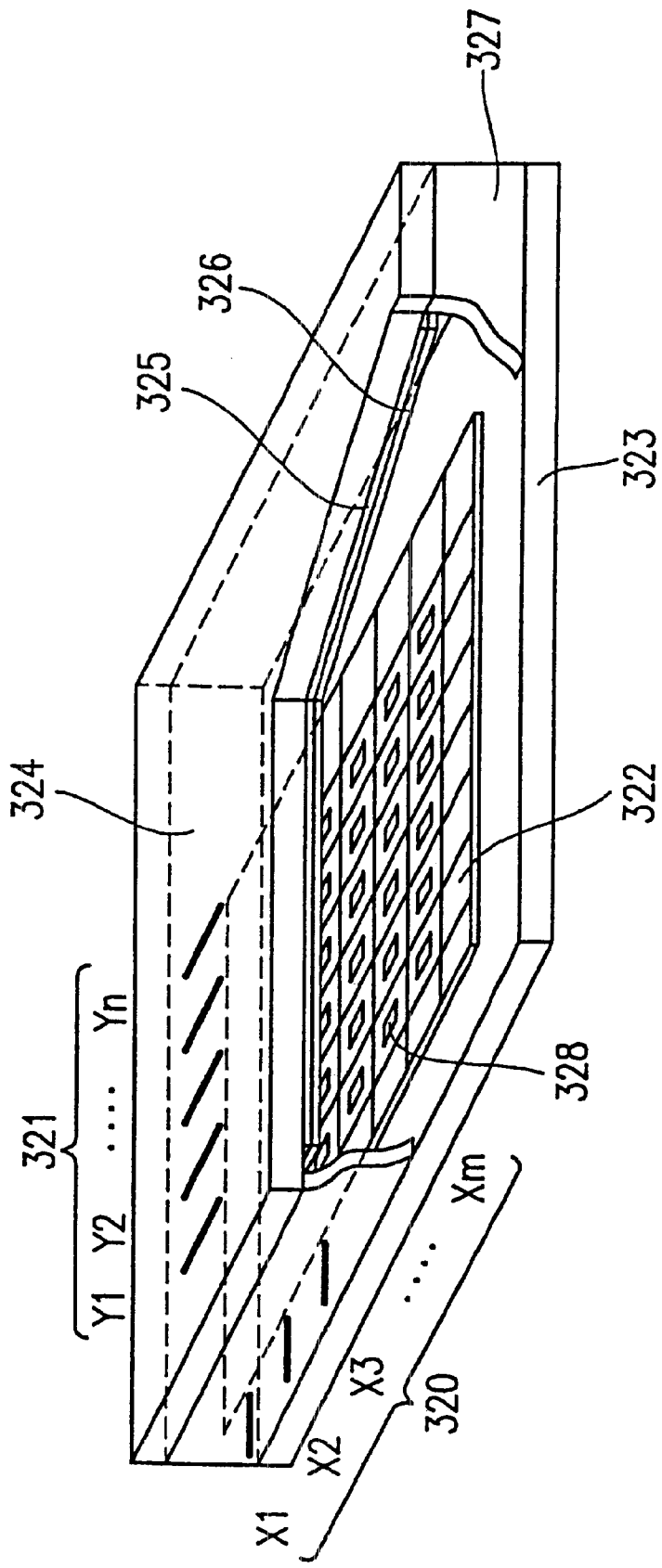
FIG. 29 is a view schematically showing a structure of an image display apparatus in a tenth example according to the present invention.

In this example, an image display apparatus, which is formed using the electron emitting source 322 produced in the ninth example, for causing a fluorescent member to emit light will be described. FIG. 29 is a schematic view showing a structure of an image display apparatus in this example.

The image display apparatus shown in FIG. 29 includes the electron emitting source 322 (see the ninth example) including electron emitting devices of the present invention connected to form a simple matrix. As described in the previous example, each electron emitting device 328 included in the electron emitting source 322 can be driven selectively and independently. The electron emitting source 322 is fixed to a back plate 323. A face plate 324 is supported by a side plate 327 and provided so as to oppose the back plate 323, thus to form an enclosure. A transparent electrode 325 and a fluorescent member 326 are formed in an inner surface of the face plate 324 (i.e., surface facing the back plate 323).

The inside of the enclosure formed of the face plate 324, the back plate 323 and the side plate 327 needs to be kept vacuum. For this purpose, the junctions of the plates are sealed to prevent vacuum leakage. In this example, frit glass is baked at a temperature of about 500° C. in a nitrogen atmosphere for sealing. After the sealing, the inside of the enclosure formed of the plates is exhausted to have a high vacuum atmosphere of about $1 \times 10^{-7}$ Torr or less by an oil-less exhausting pump such as an ion pump while being heated when necessary. Thereafter, the junctions are finally sealed. A getter (not shown) is provided inside the enclosure in order to maintain the vacuum atmosphere.

The fluorescent member 326 on the inner surface of the face plate 324 is arranged in a black stripe pattern and is formed by, for example, a printing technique. The transparent electrode 325, which acts as a extraction electrode for applying a bias voltage for accelerating the emitted electrons, is formed by, for example, an RF sputtering technique.

In order to accelerate the emitted electrons, a very thin metalback can be provided on a surface of the fluorescent member 326 instead of providing the transparent electrode 325 (extraction electrode). In this structure also, the effect of the present invention is effectively obtained.

In the image display apparatus having such a structure, a prescribed input signal is applied to each of the electron emitting devices 328 from an external prescribed driving circuit (not shown) through the X direction lines 320 and the Y direction lines 321 (see FIG. 28 referred to in the ninth example). Thus, the electron emission from each electron emitting device 328 is controlled and the fluorescent member 326 is caused to emit light in a prescribed pattern by the emitted electrons. The image display apparatus, such as a flat panel display, obtained in this manner can display a high luminance, high definition image.

The enclosure formed by the plate is not limited to have the above-described structure. For example, a support can be provided between the face plate 324 and the back plate 323 in order to guarantee a sufficient strength against the atmospheric pressure. Alternatively, a focus electrode (electrode for focusing) can be provided between the electron emitting source 322 and the face plate 324 in order to further enhance the focusing characteristic of the electron beam emitted.

As described above, the image display apparatus in this example includes at least an electron emitting source 322 including a plurality of electron emitting devices 328, an image forming member such as the fluorescent member 326, and an enclosure for maintaining the electron emitting source 322 and the image forming member in a vacuum state. An image is formed by accelerating the electrons emitted from the electron emitting source 322 (each electron emitting device 328) in accordance with an input signal and directing the electrons toward the image forming member (fluorescent member 326). Especially, by providing the electron emitting source 322 according to the present invention which is capable of highly efficient and highly stable electron emission, the fluorescent member 326 can be caused to emit light having a high luminance with a satisfactory controllability.

Various examples have been described. The features separately described in different examples can be appropriately combined. The materials of the elements and members, and the methods for forming the same can be appropriately varied.

A counter electrode (electron extraction electrode) as a second electrode in the present invention can be provided as a part of an electron emitting device or as a separate element not included in the electron emitting device.

INDUSTRIAL APPLICABILITY

As described above, according to the present invention, a highly stable electron emitting device for emitting electrons efficiently and uniformly is obtained by forming an electron emitting section using particles containing a carbon material having a carbon six-membered ring structure or an aggregate of the particles. Especially, in the case where a carbon material having a structure in which a σ bond of carbon six-membered rings is broken (e.g., graphite or carbon nanotubes) is used as an electron emitting material for forming the electron emitting section, the electrons can be emitted more efficiently and thus a large amount of emission current is obtained.

In an electron emitting source including a plurality of electron emitting devices according to the present invention which are, for example, arranged two-dimensionally, the area from which the electrons are emitted can be enlarged. By appropriately setting the electric connection state to each of the electron emitting devices forming the electron emitting source, the amount of electron emission from each electron emitting device can be controlled in accordance with the input signal. An arbitrary electron emission distribution can be obtained, or the power consumption can be reduced.

By combining the above-mentioned electron emitting device (electron emitting source) and an image forming member irradiated with electrons to form an image, an image display apparatus capable of causing the image forming member to emit light having a high luminance with a satisfactory controllability (for example, flat panel display) can be provided.

According to the present invention, a carbon material having a structure in which a σ bond of carbon six-membered rings is broken (e.g., graphite or carbon nanotubes), which is very suitable for forming an electron emitting section, can be used in a format capable of acting as an electron emitting section, at a prescribed surface with a satisfactory reproducibility at an arbitrary density. Thus, a highly efficient electron emitting device can easily be formed.

In another structure of the electron emitting device according to the present invention, particles of an electron emitting material are fixed to a conductive layer acting as an electron supply source with a fixing material. Due to such a structure, a stable and highly reliable fixation state is realized, thus stabilizing the emission current.

For application of a fixing material, a solution obtained by mixing particles of the electron emitting material in a fixing material can be applied by, for example, spin coating due to the appropriate viscosity thereof. Since this realizes easy application of a fixing material, a uniform and highly dense distribution of particles or aggregates of particles in the electron emitting section can easily be realized. This allows a uniform and highly dense emission state and further production of a highly efficient electron emitting device to be realized easily.

What is claimed is:

1. An electron emitting device, comprising at least a first electrode and an electron emitting section provided on the first electrode, wherein:
   the electron emitting section is formed of a particle or an aggregate of particles, and
   the particle contains a carbon material having a carbon six-membered ring structure, the structure having a portion at which a σ bond of carbon six-membered rings is broken.

2. An electron emitting device according to claim 1, further comprising a second electrode provided in the vicinity of the electron emitting section.

3. An electron emitting device according to claim 1, wherein the electron emitting section is fixed to the first electrode with a fixing material.

4. An electron emitting device according to claim 1, wherein the first electrode has a surface having a rugged pattern, and the electron emitting section is provided on the rugged pattern of the surface.

5. An electron emitting device according to claim 1, wherein the carbon material having a carbon six-membered ring structure has graphite and the graphite is highly oriented graphite.

6. An electron emitting device according to claim 1, wherein the electron emitting section is provided on the first electrode in a state where a portion at which the a bond of the carbon six-membered rings is broken is directed in an electron emitting direction.

7. An electron emitting device according to claim 1, wherein the carbon material having a carbon six-membered ring structure, the structure having a portion at which a σ bond of carbon six-membered rings is broken, has a carbon nanotube and a tip of the carbon nanotube projects from a surface of the particle.

8. An electron emitting device according to claim 1, wherein the carbon material having a carbon six-membered ring structure, the structure having a portion at which a σ bond of carbon six-membered rings is broken, has a carbon nanotube and a tip of the carbon nanotube is opened without being closed.

9. An electron emitting device according to claim 1, wherein the carbon material having a carbon six-membered ring structure, the structure having a portion at which a σ bond of carbon six-membered rings is broken, has a carbon nanotube and the carbon nanotube is formed by refining bulk carbon containing a carbon nanotube generated by arc discharge between carbon electrodes.

10. An electron emitting device according to claim 1, wherein the carbon nanotube is formed by a plasma CVD technique utilizing a catalytic action.

11. An electron emitting device according to claim 3, wherein the fixing material is a vehicle.

12. An electron emitting device according to claim 1, wherein the first electrode includes an element which is capable of generating a carbon compound.

13. An electron emitting device according to claim 1, wherein the first electrode includes a multiple layer structure including at least one semiconductor layer.

14. An electron emitting source, comprising:
   a plurality of electron emitting devices arranged in a prescribed pattern; and
   means for supplying an input signal to each of the plurality of electron emitting devices, wherein:
   each of the plurality of electron emitting devices is according to claim 1, and
   the plurality of electron emitting devices each emit electrons in accordance with the input signal thereto.

15. An image display apparatus, comprising:
   an electron emitting source according to claim 14; and
   an image forming member irradiated with electrons emitted from the electron emitting source to form an image.

16. An electron emitting device, comprising at least a first electrode and an electron emitting section provided on the first electrode, wherein:
   the electron emitting section is formed of a particle or an aggregate of particles,
   the electron emitting section is fixed on the first electrode with a fixing material, and
   the particle contains a carbon material having a carbon six-membered ring structure, the structure having a portion at which a σ bond of carbon six-membered rings is broken.

17. An electron emitting device according to claim 16, wherein the fixing material is a vehicle.

18. An electron emitting device according to claim 16, wherein the fixing material exists only in a portion of a surface of the first electrode at which the electron emitting section is fixed and does not exist in the remaining part of the surface of the first electrode.

19. An electron emitting source, comprising:
   a plurality of electron emitting devices arranged in a prescribed pattern; and
   means for supplying an input signal to each of the plurality of electron emitting devices, wherein:
   each of the plurality of electron emitting devices is according to claim 16, and
   the plurality of electron emitting devices each emit electrons in accordance with the input signal thereto.

20. An image display apparatus, comprising:
   an electron emitting source according to claim 19; and
   an image forming member irradiated with electrons emitted from the electron emitting source to form an image.

21. A method for producing an electron emitting device, comprising at least the steps of:
   forming a first electrode; and
   providing an electron emitting section formed of a particle or an aggregate of particles on the first electrode,
   wherein a particle formed of a material containing a carbon material having a carbon six-membered ring structure, the structure having a portion at which a σ bond of carbon six-membered rings is broken, is used as the particle.

22. A method for producing an electron emitting device according to claim 21, further comprising the step of providing a second electrode in the vicinity of the electron emitting section.

23. A method for producing an electron emitting device according to claim 21, wherein the step of providing the electron emitting section includes the step of fixing the electron emitting section to the first electrode with a fixing material.

24. A method for producing an electron emitting device according to claim 23, wherein a vehicle is used as the fixing material.

25. A method for producing an electron emitting device according to claim 21, further comprising the step of forming a surface of the first electrode to have a rugged pattern, wherein the electron emitting section is provided along the rugged pattern.

26. A method for producing an electron emitting device according to claim 25, wherein the rugged pattern is formed by a sand blasting technique.

27. A method for producing an electron emitting device according to claim 25, wherein the rugged pattern is formed by an etching technique.

28. A method for producing an electron emitting device according to claim 21, wherein the step of providing the electron emitting section on the first electrode includes:
   an application step of applying a solution obtained by mixing the particle in a prescribed fixing material onto a surface of the first electrode, and
   a drying step of drying-the applied solution.

29. A method for producing an electron emitting device according to claim 28, wherein the application step is performed by spinner application.

30. A method for producing an electron emitting device according to claim 28, wherein by the drying step, the fixing material is removed from a part of a surface of the electron emitting section, the part being in the vicinity of an electron emitting site and including the electron emitting site.

31. A method for producing an electron emitting device according to claim 28, further comprising the step of removing the fixing material at least from a part of a surface of the electron emitting section, the part being in the vicinity of an electron emitting site and including the electron emitting site.

32. A method for producing an electron emitting device according to claim 21, wherein the step of providing the electron emitting section on the first electrode includes:
   an application step of applying a solution which contains a particle forming the electron emitting device mixed therein onto a surface of the first electrode, and
   a treatment step of removing the solution at least from a part of a surface of the electron emitting section, the part being in the vicinity of an electron emitting site and including the electron emitting site, while forming a carbide between the electron emitting section and the first electrode,
   wherein the electron emitting section is fixed to the first electrode with the carbide.

33. A method for producing an electron emitting device according to claim 32, wherein the treatment step includes a step of exposure to a plasma containing at least one of hydrogen, oxygen, nitrogen, argon, krypton and hydrocarbon.

34. A method for producing an electron emitting source, comprising the steps of:
   forming a plurality of electron emitting devices which are arranged in a prescribed pattern so as to emit electrons in accordance with an input signal to each of the plurality of electron emitting devices; and
   forming means for supplying the input signal to each of the plurality of electron emitting devices,
   wherein each of the plurality of electron emitting devices is formed by a method according to claim 21.

35. A method for producing an image display apparatus, comprising the steps of:
   forming an electron emitting source; and
   providing an image forming member, irradiated with electrons emitted from the electron emitting source to form an image, at a prescribed positional relationship with respect to the electron emitting source,
   wherein the electron emitting source is formed by a method according to claim 34.

36. A method for producing an electron emitting device, comprising at least the steps of:
   forming a first electrode; and
   providing an electron emitting section formed of a particle or an aggregate of particles on the first electrode,
   wherein the step of providing the electron emitting section on the first electrode includes:
      an application step of applying a solution obtained by mixing a fixing material and the particle forming the electron emitting section onto a surface of the first electrode, and
      a drying step of drying the solution so as to remove the fixing material at least from a part of a surface of the electron emitting section, the part being in the vicinity of an electron emitting site and including the electron emitting site.

37. A method for producing an electron emitting device according to claim 36, wherein a particle formed of a material containing a carbon material having a carbon six-membered ring structure, the structure having a portion at which a σ bond of carbon six-membered rings is broken, is used as the particle.

38. A method for producing an electron emitting device according to claim 36, wherein a vehicle is used as the fixing material.

39. A method for producing an electron emitting device according to claim 36, wherein as a result of the drying step, the fixing material exists only in a portion of the surface of the first electrode at which the electron emitting section is fixed and does not exist in the remaining part of the surface of the first electrode.

40. A method for producing an electron emitting source, comprising the steps of:
   forming a plurality of electron emitting devices which are arranged in a prescribed pattern so as to emit electrons in accordance with an input signal to each of the plurality of electron emitting devices; and
   forming means for supplying the input signal to each of the plurality of electron emitting devices,
   wherein each of the plurality of electron emitting devices is formed by a method according to claim 36.

41. A method for producing an image display apparatus, comprising the steps of:
   forming an electron emitting source; and
   providing an image forming member, irradiated with electrons emitted from the electron emitting source to form an image, at a prescribed positional relationship with respect to the electron emitting source,
   wherein the electron emitting source is formed by a method according to claim 40.

* * * * *